United States Patent
Kogawa

(10) Patent No.: US 8,054,899 B2
(45) Date of Patent: Nov. 8, 2011

(54) TERMINAL APPARATUS, BASE STATION AND COMMUNICATION METHOD

(75) Inventor: Tsuyoshi Kogawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 708 days.

(21) Appl. No.: 12/144,059

(22) Filed: Jun. 23, 2008

(65) Prior Publication Data
US 2009/0010357 A1    Jan. 8, 2009

(30) Foreign Application Priority Data
Jul. 2, 2007    (JP) .................................. 2007-174421

(51) Int. Cl.
H04L 27/28    (2006.01)

(52) U.S. Cl. ........ 375/260; 375/267; 375/259; 375/284; 375/285; 455/59; 370/230

(58) Field of Classification Search .................... 375/260
See application file for complete search history.

(56) References Cited

U.S. PATENT DOCUMENTS

| | | | |
|---|---|---|---|
| 6,188,717 B1 * | 2/2001 | Kaiser et al. ................. | 375/148 |
| 6,473,467 B1 | 10/2002 | Wallace et al. | |
| 6,952,454 B1 | 10/2005 | Jalali et al. | |
| 7,573,944 B2 * | 8/2009 | Chang et al. ................. | 375/260 |
| 7,664,193 B2 | 2/2010 | Jalali et al. | |
| 7,751,492 B2 | 7/2010 | Jalali et al. | |
| 7,804,765 B2 * | 9/2010 | Tzannes et al. ............... | 370/210 |
| 7,804,910 B2 * | 9/2010 | Shen et al. .................... | 375/267 |
| 7,813,441 B2 | 10/2010 | Jalali et al. | |
| 7,873,100 B2 * | 1/2011 | Koyama ........................ | 375/152 |
| 7,916,801 B2 * | 3/2011 | Harikumar et al. ........... | 375/260 |
| 7,953,168 B2 * | 5/2011 | Sakai et al. ................... | 375/260 |
| 2002/0154705 A1 | 10/2002 | Walton et al. | |
| 2004/0125732 A1 * | 7/2004 | Cheng et al. ................. | 369/59.27 |
| 2005/0068886 A1 * | 3/2005 | Wang et al. ................... | 370/210 |
| 2005/0270969 A1 * | 12/2005 | Han et al. ..................... | 370/210 |
| 2005/0286465 A1 * | 12/2005 | Zhuang ......................... | 370/329 |

(Continued)

FOREIGN PATENT DOCUMENTS
CN    1448015 A    10/2003
(Continued)

OTHER PUBLICATIONS

Kazuki Takeda, et al., "BER Performance Analysis of Joint Tomlonson-Harashima Precoding and Frequency-domain Equalization", Wireless Communications and Networking Conference, IEEE, Mar. 15, 2007, pp. 1466-1470.

(Continued)

Primary Examiner — Chieh M Fan
Assistant Examiner — Santiago Garcia
(74) Attorney, Agent, or Firm — Oblon, Spivak, McClelland, Maier & Neustadt, L.L.P.

(57) ABSTRACT

A terminal apparatus including a block generation unit, a transmission timing calculation unit, and a transmission unit. The block generation unit generates a block that includes a plurality of symbols being temporally consecutive and one or more repetition symbols added to a head end of the symbols. The transmission timing calculation unit calculates a transmission timing at which the block is to be transmitted to an external apparatus according to a symbol rate of the block and a number of extended repetition symbols included in the block. The transmission unit transmits the block to the external apparatus at the transmission timing calculated by the transmission timing calculation unit.

14 Claims, 20 Drawing Sheets

U.S. PATENT DOCUMENTS

| | | | |
|---|---|---|---|
| 2006/0083159 A1 | 4/2006 | Laroia et al. | |
| 2006/0087961 A1* | 4/2006 | Chang et al. | 370/203 |
| 2006/0203896 A1* | 9/2006 | Clausen et al. | 375/219 |
| 2006/0256883 A1* | 11/2006 | Yonge et al. | 375/260 |
| 2007/0223365 A1* | 9/2007 | Tsfaty et al. | 370/208 |
| 2008/0002645 A1* | 1/2008 | Seki et al. | 370/338 |
| 2009/0067540 A1* | 3/2009 | Lee et al. | 375/296 |
| 2009/0135803 A1* | 5/2009 | Luo et al. | 370/350 |
| 2010/0142638 A1* | 6/2010 | Jalali et al. | 375/260 |

FOREIGN PATENT DOCUMENTS

| | | |
|---|---|---|
| JP | 2001-168788 | 6/2001 |
| JP | 2007-96468 | 4/2007 |

OTHER PUBLICATIONS

Office Action issued Aug. 11, 2010, in Chinese Patent Application No. 200810215460.0.

* cited by examiner

TERMINAL APPARATUS, BASE STATION AND COMMUNICATION METHOD

CROSS REFERENCE TO RELATED APPLICATIONS

This application is based upon and claims the benefit of priority from the prior Japanese Patent Applications No. 2007-174421, filed on Jul. 2, 2007; the entire contents of which are incorporated herein by reference.

BACKGROUND OF THE INVENTION

1. Field of the Invention

The present invention relates to a terminal apparatus, base station and communication method carrying out, for example, a single carrier communication.

2. Related Art

There is conventionally known a method whereby a base station collectively receives single carrier signals with cyclic prefixes (CP) transmitted from a plurality of terminal apparatuses using a Fast Fourier Transform (FFT). Collective reception requires transmission timings from the respective terminal apparatuses to be controlled to an FFT timing of the base station and, for example, JP-A 2007-96468 (Kokai) realizes timing control by detecting timings from delay profiles of the respective terminal apparatuses and feeding back timing information to the respective terminal apparatuses.

However, when a signal bandwidth of a single carrier from a certain terminal apparatus increases/decreases, for example, when a symbol rate changes, an optimal FFT timing (reception timing) at the base station may differ, but the method described in the JP-A 2007-96468 (Kokai) has such a problem that when the signal bandwidth of a single carrier from a certain terminal apparatus increases/decreases, it takes time until optimal timing control is realized.

That is, when the signal bandwidth of a single carrier transmitted from the terminal apparatus increases/decreases in the method described in the JP-A 2007-96468 (Kokai), optimal timing control becomes possible not until the base station receives the transmission signal of the terminal apparatus, detects a timing error first, generates timing information based on the result thereof and feeds back the timing information to the terminal apparatus. For this reason, there is a problem that it takes time until optimal timing control is realized, and since timings of transmission signals from the terminal apparatus in the mean time are not optimal, the reception characteristic at the base station deteriorates and adversely affects neighboring transmission paths.

SUMMARY OF THE INVENTION

According to an aspect of the present invention, there is provided with a terminal apparatus comprising:

a block generation unit configured to generate a block that includes a plurality of symbols being temporally consecutive and one or more repetition symbols added to a head end of the symbols, the repetition symbols having same waveform as a partial waveform including a rear end of the symbols and $S_{Vini}$ ($S_{Vini}$ is greater than or equal to 0) symbol preceding the partial waveform including the rear end of the symbols being an extended repetition symbol having same waveform as that of $S_{Vini}$ symbol on a rear end of an immediately preceding block before the block;

a transmission timing calculation unit configured to calculate a transmission timing at which the block is transmitted according to a symbol rate of the block and a number of extended repetition symbols included in the block; and a transmission unit configured to transmit the block at the transmission timing calculated by the transmission timing calculation unit.

According to an aspect of the present invention, there is provided with a terminal apparatus comprising:

a block generation unit configured to generate a block of a predetermined time length that includes a plurality of symbols being temporally consecutive and one or more repetition symbols added to one end of the symbols, the repetition symbols having same waveform as a partial waveform including the other end of the symbols;

a transmission timing calculation unit configured to calculates, as a transmission timing at which the block is transmitted, an earlier timing as a symbol rate of the block increases and a later timing as a symbol rate of the block decreases; and a transmission unit configured to transmit the block at the transmission timing calculated by the transmission timing calculation unit.

According to an aspect of the present invention, there is provided with a base station, comprising:

a reception unit configured to receive from a terminal apparatus a block of a predetermined time length that includes a plurality of symbols being temporally consecutive and one or more repetition symbols added to one end of the symbols, the repetition symbols having same waveform as a partial waveform including the other end of the symbols;

a Fourier transform unit configured to perform a Fourier transform on a signal of a received block in a FFT section having a length of the symbols;

a timing error detecting unit configured to detect a timing error of the Fourier transform performed on the signal of the received block with respect to a desired timing;

a transmission timing calculation unit configured to calculate a transmission timing for the terminal apparatus to transmit the block according to the timing error;

a symbol rate reporting unit configured to determine a symbol rate of a block to be transmitted from the terminal apparatus and report a determined symbol rate to the terminal apparatus;

a transmission timing correction unit to correct a calculated transmission timing so that the calculated transmission timing becomes earlier as an absolute value of a difference between a determined symbol rate and the symbol rate of the received block increases, when the determined symbol rate is greater than that of the received block, and correct a calculated transmission timing so that the calculated transmission timing becomes later as an absolute value of a difference between the symbol rate of the received block and the determined symbol rate increases, when the symbol rate of the received block is greater than the determined symbol rate.

a timing information reporting unit configured to report timing information indicating a corrected transmission timing to the terminal apparatus.

According to an aspect of the present invention, there is provided with a communication method comprising:

generating a block of a predetermined time length that includes a plurality of symbols being temporally consecutive and one or more repetition symbols added to one end of the symbols, the repetition symbols having same waveform as a partial waveform including the other end of the symbols;

calculating, as a transmission timing at which the block is transmitted, an earlier timing as a symbol rate of the block increases and a later timing as a symbol rate of the block decreases; and transmitting the block at a calculated transmission timing.

DETAILED DESCRIPTION OF THE INVENTION

With reference now to the attached drawings, embodiments of the present invention will be explained in detail below.

First Embodiment

Figure 1:
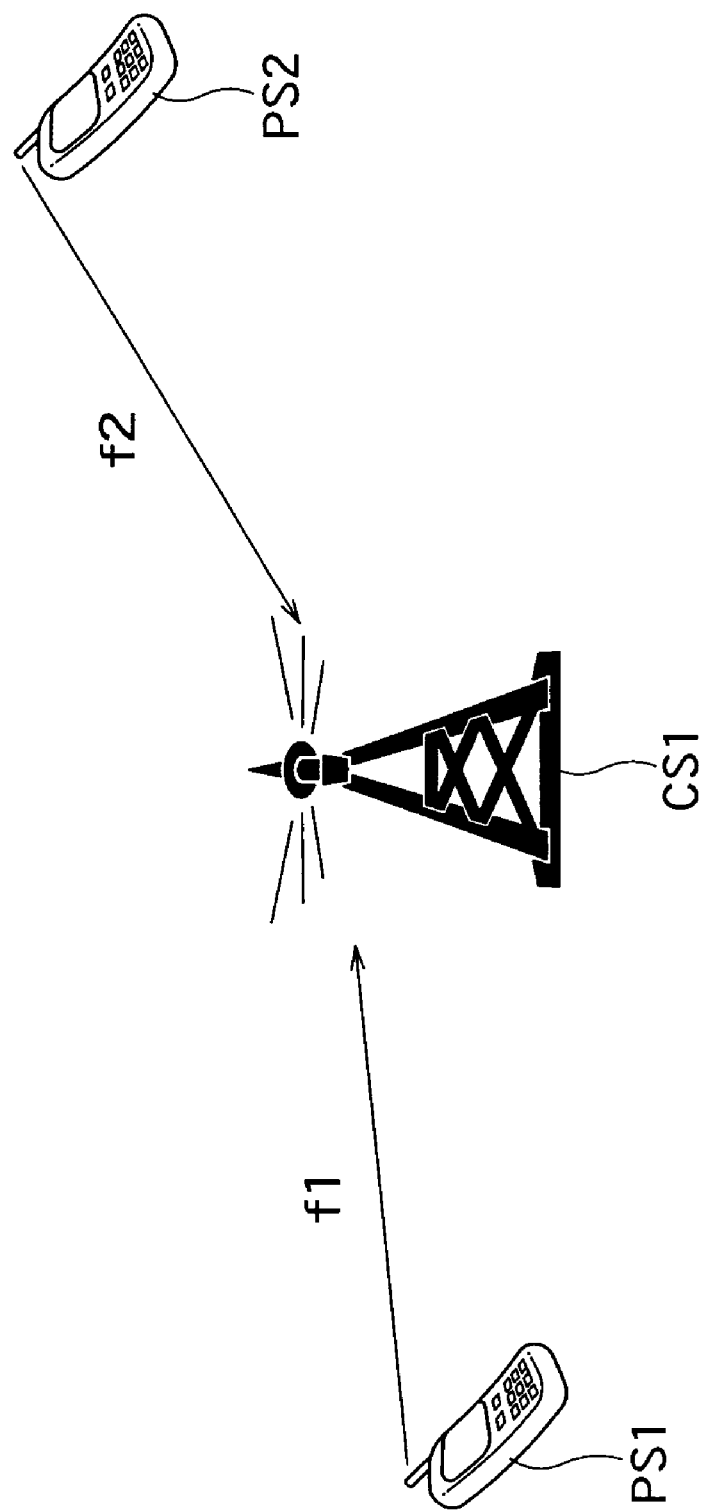
FIG. 1 shows a configuration example of a mobile communication system according to a first embodiment.

FIG. 1 shows a configuration example of a mobile communication system according to a first embodiment.

A base station CS1 and a plurality of terminal apparatuses PS1, PS2, . . . which communicate with the base station CS1 belong to a mobile communication system according to this embodiment. The plurality of terminal apparatuses PS1, PS2, . . . simultaneously transmit signals at different frequencies f1, f2, . . . and the base station CS1 collectively receives those transmission signals.

Each terminal apparatus codes information bits, modulates the coded bits and adds a CP (Cyclic Prefix) to generate a block and transmits the block generated. The terminal apparatus transmits data blocks, pilot blocks and synchronization blocks or the like as blocks. Examples of data blocks are shown in FIG. 2(a) to 2(c).

Figure 2:
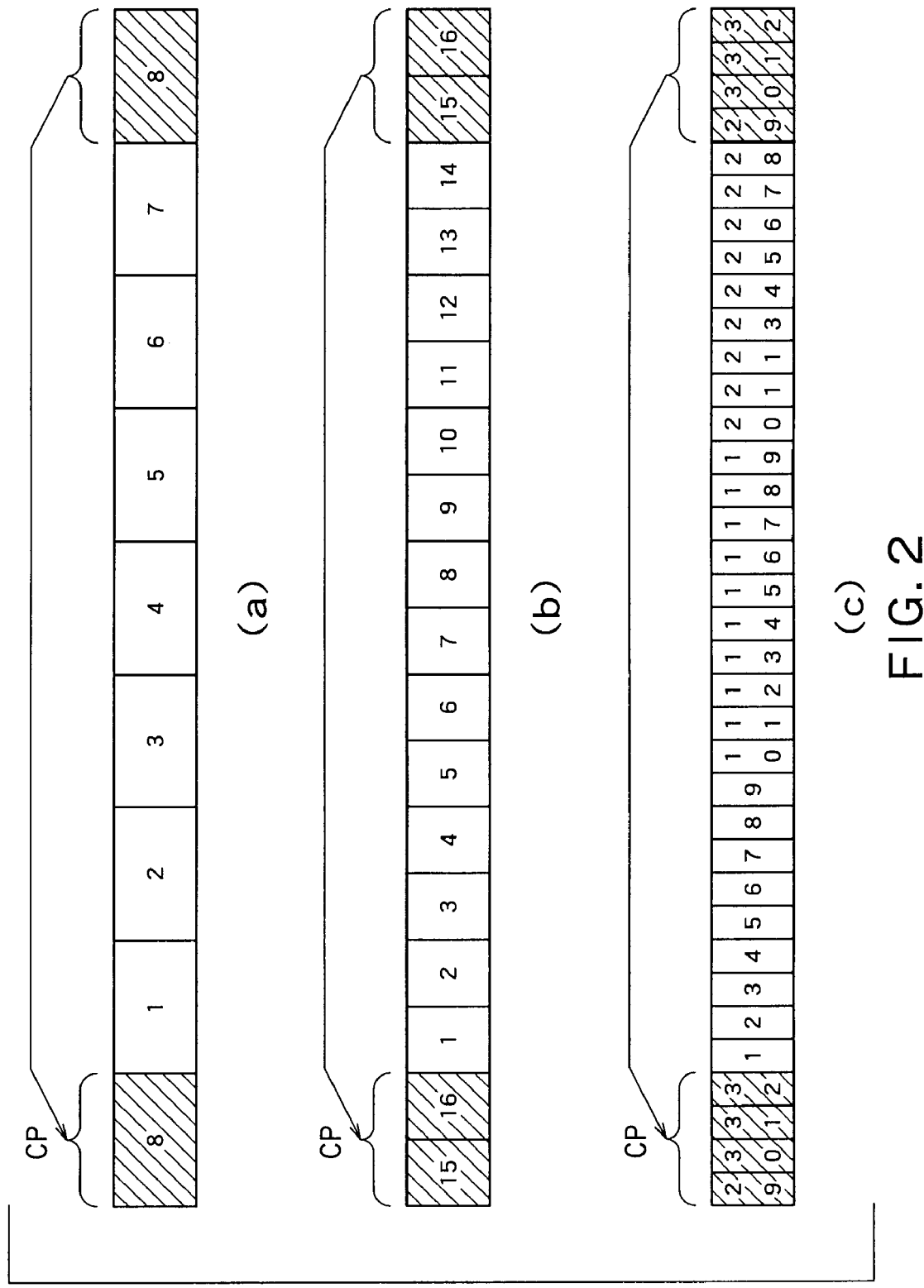
FIG. 2 shows examples of data block.

The data block in FIG. 2(a) includes eight data symbols (data part) and a cyclic prefix (repetition symbol) which is a copy of one symbol at a rear end of the data part and added to a head thereof. The data block in FIG. 2(b) includes 16 data symbols (data part) and cyclic prefixes (repetition symbols) which are copies of two symbols at the rear end of the data part and added to the head thereof. The number of cyclic prefixes (repetition symbols) may be one. The data block in FIG. 2(c) includes 32 data symbols (data part) and cyclic prefixes (repetition symbols) which are copies of four symbols at the rear end of the data part and added to the head thereof. The time lengths of the respective data blocks in FIG. 2(a) to 2(c) are the same. Adding the cyclic prefixes as shown in FIG. 2(a) to 2(c) allows the receiving side to equalize received signals in a frequency domain, and can thereby maintain high reception quality through relatively simple calculations even in a multipath environment. In the example of FIG. 2, a portion from the rear end of the data part is copied to the head, but a portion from the head of the data part may also be copied to the rear end. In this case, the symbols added to the rear end correspond to repetition symbols. In this way, the terminal apparatus generates a block of a predetermined time length with the same waveform as a partial waveform including one end of a plurality of symbols added to the other end of a plurality of temporally continuous symbols and sends the block.

Each terminal apparatus in FIG. 1 can send blocks by switching between two or more different symbol rates. For example, the terminal apparatus can send blocks by switching between the three different symbol rates shown in FIGS. 2(a), 2(b) and 2(c). The terminal apparatus can naturally send blocks at any symbol rate other than the symbol rates shown in FIG. 2.

Figure 3:
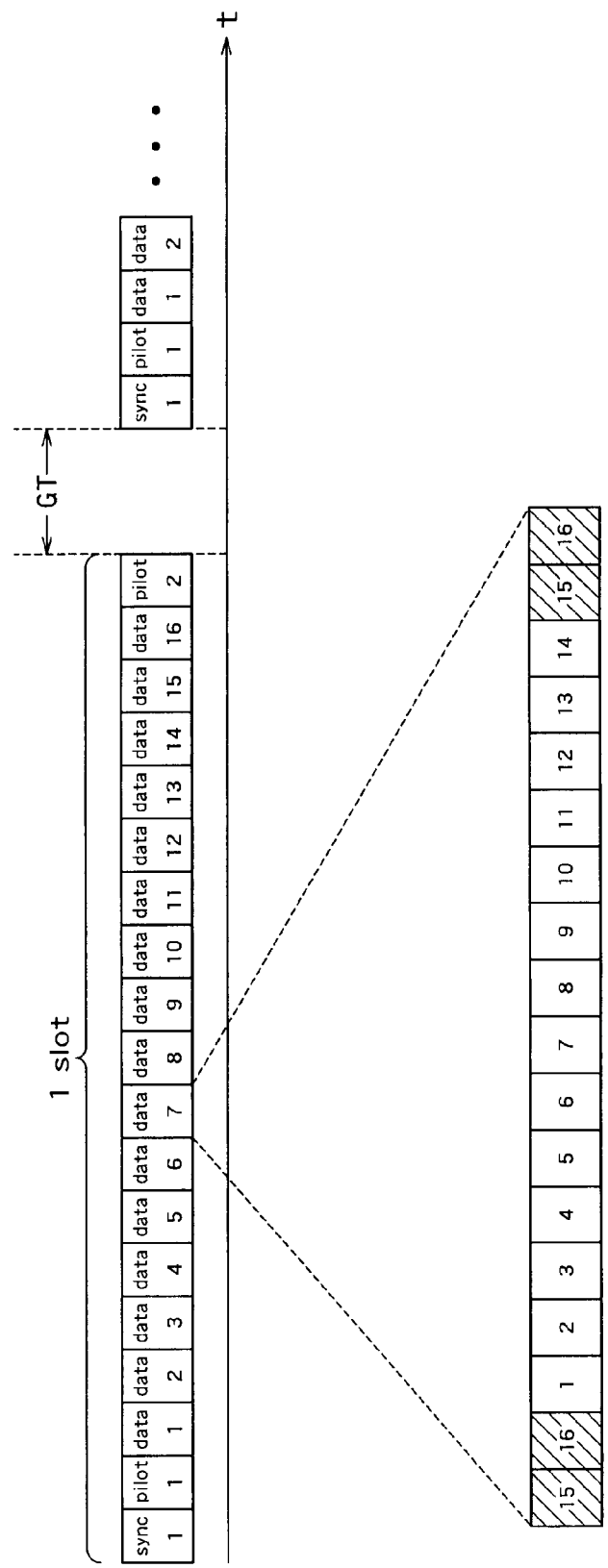
FIG. 3 shows an example of slot format sent by a terminal apparatus.

Suppose each terminal apparatus in FIG. 1 carries out a communication with the base station using a slot consisting of a plurality of blocks as the unit. FIG. 3 shows an example of slot format which defines the format of a slot transmitted by each terminal apparatus. In the example of FIG. 3, one slot consists of one sync block, two pilot blocks and sixteen data blocks. Moreover, a guard time is provided between two temporally contiguous slots.

Figure 4:
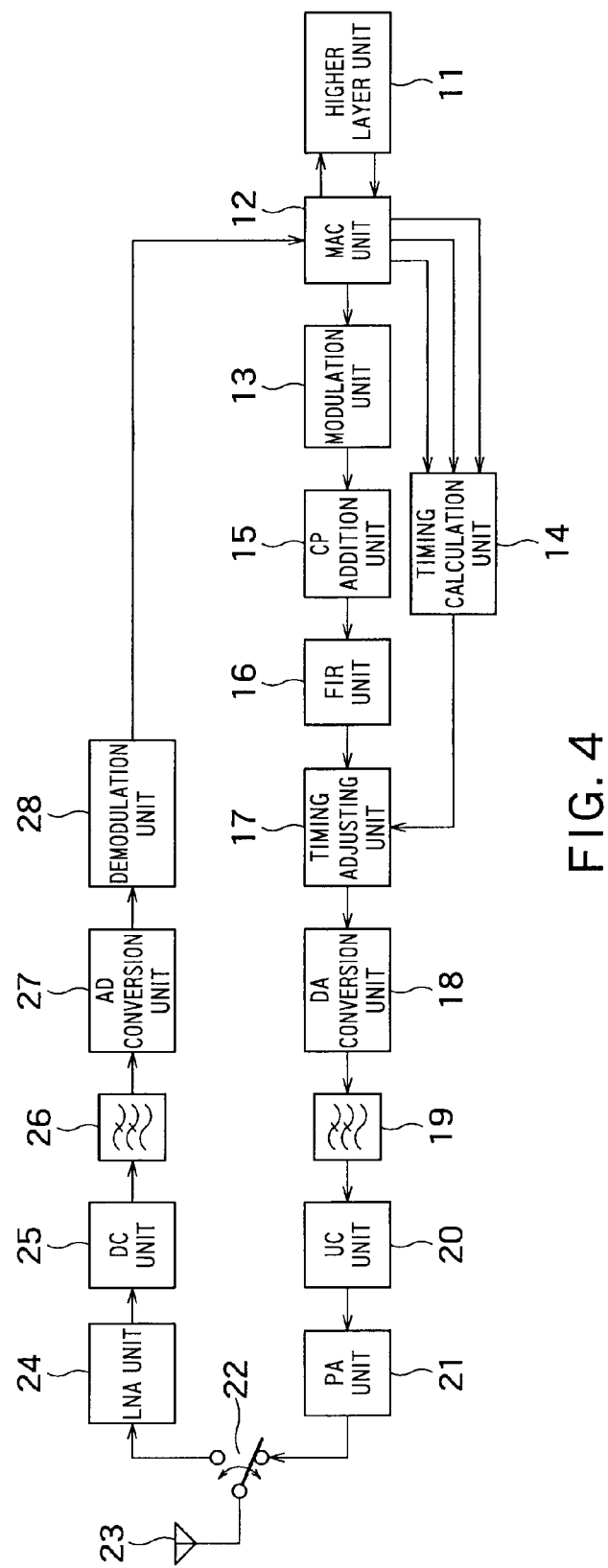
FIG. 4 is a block diagram showing the configuration of the terminal apparatus.

FIG. 4 is a block diagram showing the configuration of a terminal apparatus.

A higher layer unit 11 performs processing on layers higher than a MAC (Media Access Control) layer. The higher layer unit 11 outputs information obtained from a higher layer to a MAC unit 12 during transmission and receives information directed to a higher layer from the MAC unit 12 during reception.

The MAC unit 12 performs processing on the MAC layer. The MAC unit 12 applies the MAC layer processing to the information to be transmitted received from the higher layer unit 11 and outputs the information to a modulation unit 13. Furthermore, the MAC unit 12 receives symbol rate information indicating the current symbol rate, timing information (which will be described later) indicating a transmission timing specified by the base station and reported from the base station and initial symbol rate information (which will be described later) indicating a symbol rate (initial symbol rate) of a block transmitted to the base station at the time of initial timing synchronization from the higher layer unit 11 and outputs the information to a timing calculation unit 14. The current symbol rate corresponds, for example, to an example of a second symbol rate and the initial symbol rate corresponding, for example, to an example of an Xth symbol rate, which is a predetermined symbol rate as a reference. Furthermore, the MAC unit 12 receives demodulated data from a demodulation unit 28, which will be described later, extracts data for a higher layer from the received demodulated data and passes the data to the higher layer unit 11.

The modulation unit 13 generates a digital baseband modulated signal based on the information inputted from the MAC unit 12 and outputs the digital baseband modulated signal generated to a CP addition unit 15.

The CP addition unit 15 adds a cyclic prefix (CP) to the digital baseband modulated signal inputted from the modulation unit 13 in block units, generates blocks and outputs signals of the blocks generated to an FIR unit 16. The MAC unit 12, modulation unit 13 and CP addition unit 15 form, for example, a block generation unit.

The FIR unit 16 performs filtering processing on the block signal inputted from the CP addition unit 15 using a Root Raised Cosine Filter composed in a finite filter length, thereby limits the signal band and outputs the block signal subjected to the filtering processing to a timing adjusting unit 17.

The timing calculation unit 14 calculates transmission timing information which defines transmission timings at which blocks should be transmitted based on the symbol rate information, timing information and initial symbol rate information inputted from the MAC unit 12 and outputs the calculated transmission timing information to the timing adjusting unit 17. The timing calculation unit 14 corresponds, for example, to a transmission timing calculation unit.

The timing adjusting unit 17 outputs the block signals inputted from the FIR unit 16 and subjected to the filtering processing to a DA (Digital-to-Analog) conversion unit 18 according to transmission timings indicated in the transmission timing information inputted from the timing calculation unit 14. The timing adjusting unit 17 may measure an output timing using a timing at which power of a block head symbol becomes a maximum as a reference or measure an output timing using other timings as a reference. The timing adjusting unit 17 corresponds, for example, to a transmission unit.

The DA conversion unit 18 converts the digital block signal inputted from the timing adjusting unit 17 to an analog block signal and outputs the analog signal to an LPF (Low Pass Filter) unit 19.

The LPF unit 19 performs filtering processing to eliminate harmonic components from the analog signal inputted from the DA conversion unit 18 using an LPF (Low Pass Filter) and outputs the baseband analog signal subjected to the filtering processing to a UC (Up-Converter) unit 20.

The UC unit 20 up-converts the analog baseband signal inputted from the LPF unit 19 to a desired RF (Radio Frequency), generates an RF signal and outputs the RF signal generated to a PA (Power Amplifier) unit 21.

The PA unit 21 amplifies power of the RF signal inputted from the UC unit 20 and outputs the power-amplified RF signal to a switch unit 22.

The switch unit 22 changes the switch so that the power-amplified RF signal inputted from the PA unit 21 is outputted to an antenna unit 23 at the time of transmission and the signal received at the antenna unit 23 is outputted to an LNA unit 24 at the time of reception.

The antenna unit 23 emits the RF signal inputted from the switch unit 22 into the space at the time of transmission and receives a signal transmitted from the base station at the time of reception.

The LNA (Low Noise Amplifier) unit performs low noise amplification processing on the RF signal from the base station inputted from the switch unit 22 and outputs the RF signal subjected to the low noise amplification processing to a DC (Down-Converter) unit 25.

The DC unit 25 down-converts the RF signal inputted from the LNA unit 24 to an analog baseband signal and outputs the analog baseband signal to an LPF (Low Pass Filter) unit 26.

The LPF unit 26 performs filtering processing using an LPF (Low Pass Filter) to eliminate harmonic components from the analog baseband signal inputted from the DC unit 25 and outputs the analog signal from which the harmonic components have been eliminated to an AD (Analog-to-Digital) conversion unit 27.

The AD conversion unit 27 converts the analog signal inputted from the LPF unit 26 to a digital signal and outputs the digital signal to the demodulation unit 28.

The demodulation unit 28 performs demodulation processing on the digital signal inputted from the AD conversion unit 27 and outputs the demodulated data to the MAC unit 12.

Hereinafter, the method of calculating transmission timing information at the timing calculation unit 14 will be explained using FIG. 5. However, the following explanations are merely an example and the present invention will by no means be limited to the following method.

Figure 5:
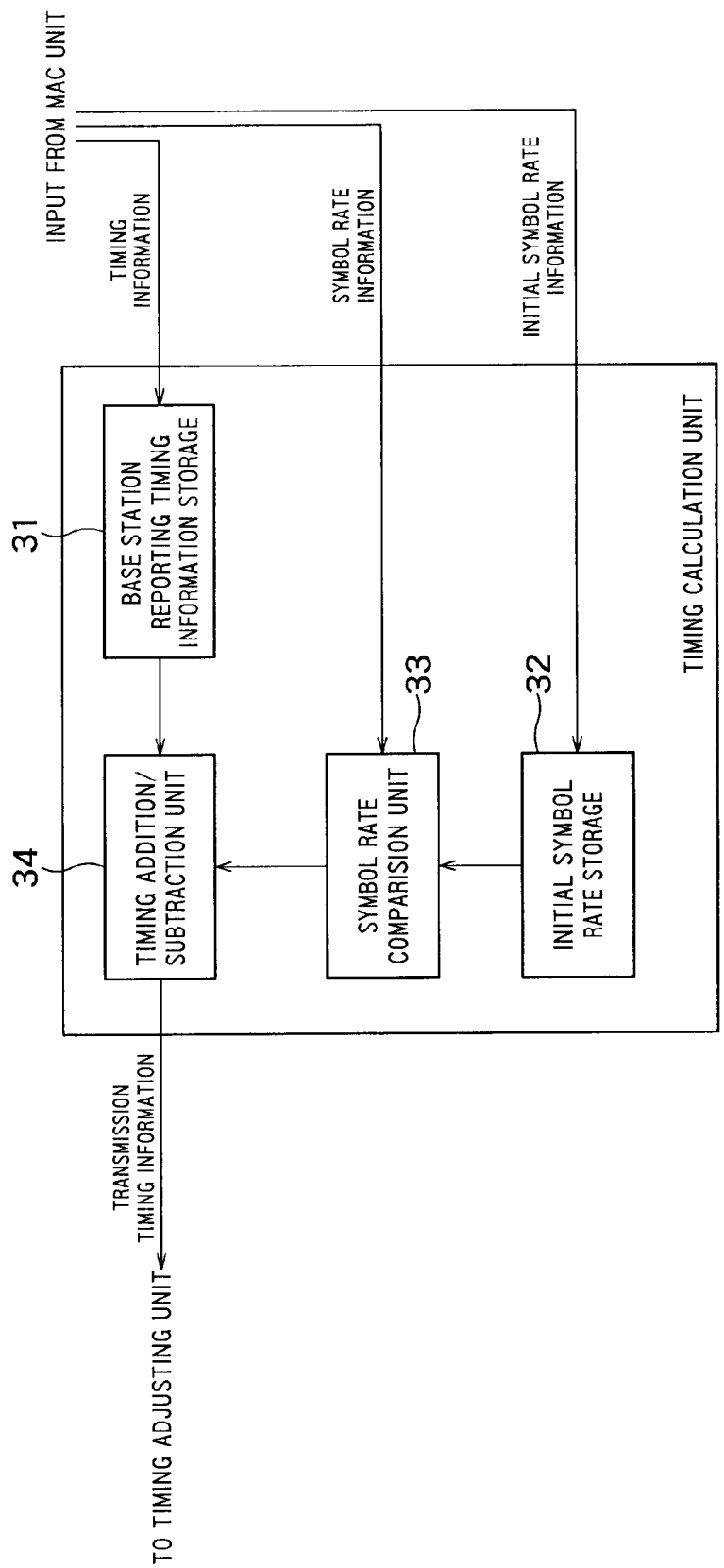
FIG. 5 is a block diagram showing the configuration of a timing calculation unit.

FIG. 5 is a block diagram showing the configuration of the timing calculation unit 14.

At the time of initial timing synchronization (initial connection) or at a predetermined time period or when the base station judges necessary, a base station reporting timing information storage 31 receives timing information reported from the base station from the MAC unit 12. The timing information is acquired, for example, as follows. At the time of timing synchronization, a first signal for establishing timing synchronization is transmitted from the terminal apparatus to the base station. Here, assuming the time of initial timing synchronization, suppose a first signal for establishing initial timing synchronization is reported with a block at an initial symbol rate. The base station which has received this first signal detects an error of the transmission timing of the block which has reported the first signal with respect to a desired timing (e.g., error of a timing of FFT carried out on the signal of the block which has reported the first signal with respect to the desired timing) based on the first signal included in the signal of the block, determines a transmission timing to be applied by the terminal apparatus based on the detected error and reports timing information indicating the determined transmission timing to the terminal apparatus.

This timing information more specifically represents a relative time difference with respect to the current transmission timing and the base station reports that transmission is carried out by shifting the transmission timing by this relative time difference with respect to the current transmission timing using the timing information. The base station reporting timing information storage 31 calculates and stores a cumulative sum of the respective pieces of timing information reported from the base station and received from the MAC unit 12 after a communication is started. That is, assuming a relative time difference reported at an nth time after the communication is started is $\Delta t_n$, a cumulative sum $\Delta t_{cs}$ stored in the base station reporting timing information storage 31 is expressed by:

$$\Delta t_{CS} = \sum_{k=1}^{n} \Delta t_k \quad \text{[Expression 1]}$$

The base station reporting timing information storage 31 outputs this cumulative sum $\Delta t_{cs}$ to a timing addition/subtraction unit 34.

An initial symbol rate storage 32 stores the initial symbol rate information inputted from the MAC unit 12. The initial symbol rate information defines a symbol rate used at the time of initial timing synchronization.

A symbol rate comparison unit 33 receives the current symbol rate information from the MAC unit 12 and also receives the initial symbol rate information from the initial symbol rate storage 32 and compares between these pieces of information. When the comparison result shows that the current symbol rate is identical to the initial symbol rate, the symbol rate comparison unit 33 outputs "0" (zero) to the timing addition/subtraction unit 34, and outputs, when the current symbol rate is higher, $$\Delta t_{comp0} = -\Delta t_{compH}(\Delta t_{compH} > 0)$$

to the timing addition/subtraction unit 34 and outputs, when the initial symbol rate is higher, $$\Delta t_{comp0} = \Delta t_{compL}(\Delta t_{compL} > 0)$$

to the timing addition/subtraction unit 34. $\Delta t_{comp0}$ corresponds to the offset amount of a transmission timing to be delayed. If $\Delta t_{comp0} < 0$, the absolute value of $\Delta t_{comp0}$ corresponds to the offset amount of a transmission timing to be advanced.

Here, when the current symbol rate is higher than the initial symbol rate, the value of $\Delta t_{compH}$ is made to increase as the absolute value of the difference between these values increases, and on the contrary, when the initial symbol rate is higher than the current symbol rate, the value of $\Delta t_{compL}$ is made to increase as the difference between these values increases. The values of $\Delta t_{compH}$ and $\Delta t_{compL}$ may also be predetermined according to each pair of initial symbol rate and current symbol rate or may also be calculated using the value of the initial symbol rate and the value of the current symbol rate.

The timing addition/subtraction unit 34 adds up the cumulative sum $\Delta t_{cs}$ inputted from the base station reporting timing information storage 31 and $\Delta t_{comp0}$ inputted from the symbol rate comparison unit 33 and outputs the result $\Delta t_{out} = \Delta t_{cs} + \Delta t_{comp0}$ to the timing adjusting unit 17 as the transmission timing information.

In this way, the timing calculation unit 14 calculates transmission timing information so that when carrying out transmission at a higher symbol rate than the initial symbol rate, transmission is carried out at a timing relatively earlier by $\Delta t_{compH}$ than the transmission timing specified by the base station and when carrying out transmission at a lower symbol rate than the initial symbol rate, transmission is carried out at a timing relatively later by $\Delta t_{compL}$ than the transmission timing specified by the base station. The reason will be explained below using FIG. 6.

Figure 6:
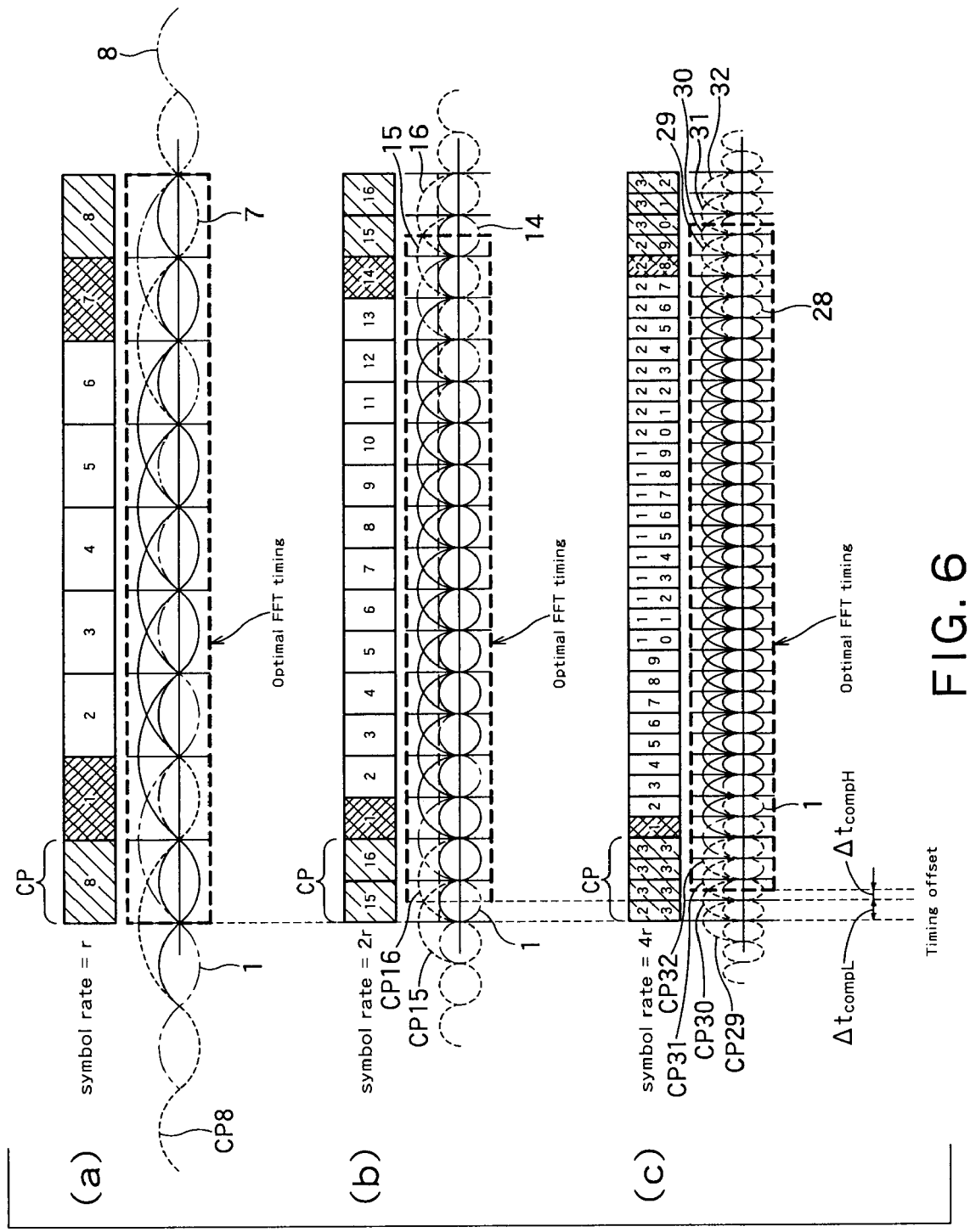
FIG. 6 shows optimal FFT timings according to a symbol rate.

FIG. 6(*a*) illustrates optimal FFT timings of blocks (see FIG. 2(*a*)) transmitted by the terminal apparatus at a symbol rate r. Transmission waveforms of a CP symbol and first to eighth symbols are subjected to filtering processing by the FIR unit 16 in FIG. 4, and therefore temporally spread and each symbol is spread over 6 symbols in this example. When the transmission waveforms of the blocks are received by the base station as they are, optimal FFT timings (reception timings) become timings enclosed by the dotted line. The "optimal" in this case means that desired signal energy included in the blocks after the CP elimination on the receiving side is a maximum. When the spread of the transmission waveform of each symbol falls within the CP length, FFT can be realized at a timing that covers the whole spread of the respective transmission waveforms and in this case, this timing is the optimal FFT timing. However, since the spread of the transmission waveform by filtering processing exceeds the CP length in FIG. 6(*a*), the desired signal energy included in the blocks after the CP elimination on the receiving side always become smaller than the energy on the transmitting side. Therefore, the timing that suppresses energy loss most actually becomes the optimal FFT timing.

The optimal FFT timing will be explained in further detail using FIG. 7.

Figure 7:
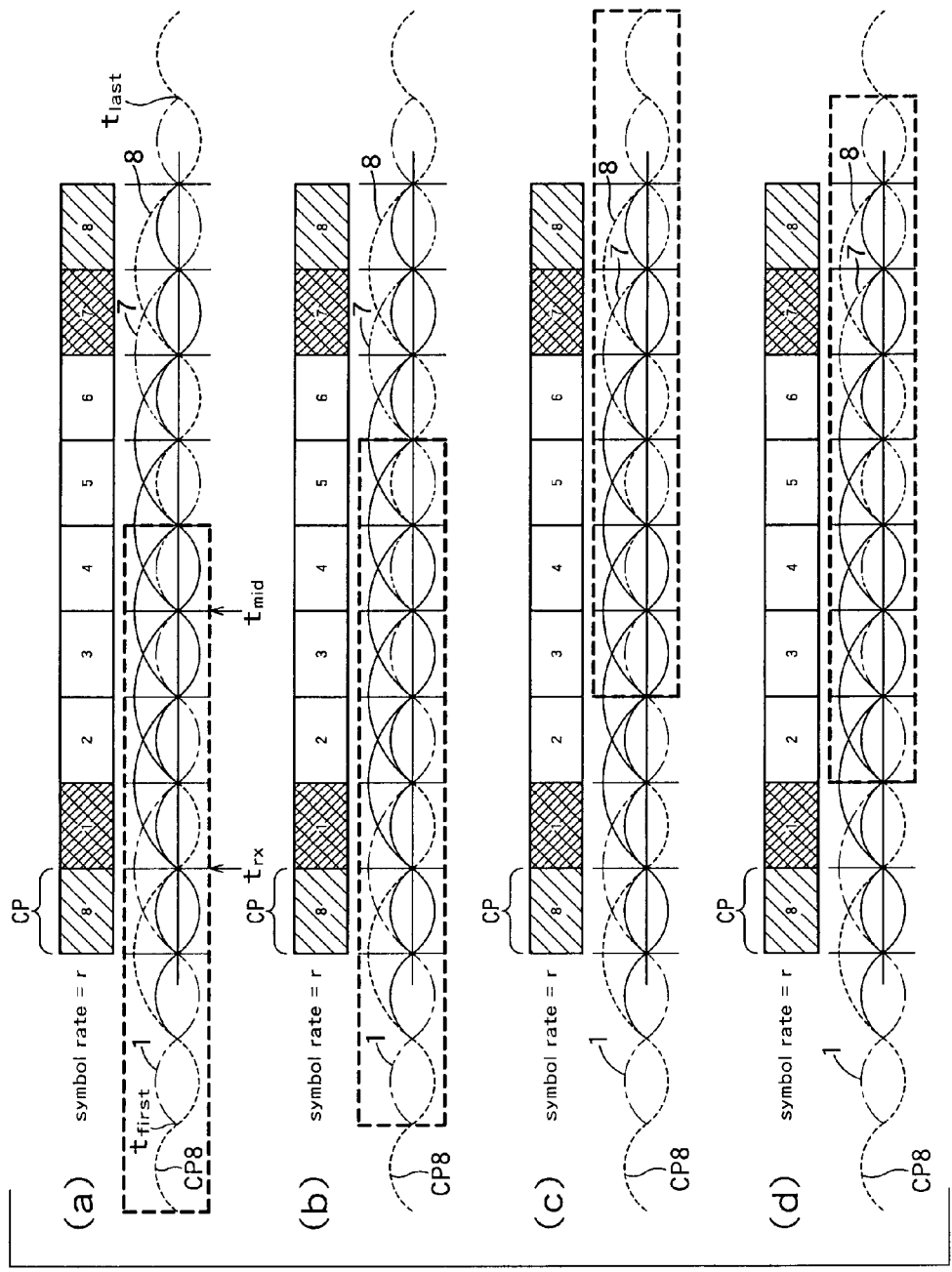
FIG. 7 illustrates optimal FFT timings.

When the FFT timing shown in FIG. 6(*a*) is set to a timing earlier by 2 symbols (the FFT timing is shifted by 2 symbols leftward in FIG. 6(*a*)), all the energy of the CP symbol and the first symbol can be received as shown in FIG. 7(*a*), but even the main lobe of the sixth and seventh symbols cannot be received.

As shown in FIG. 7(*b*), when reception is carried out at a timing later by 1 symbol than FIG. 7(*a*), all the energy of the eighth symbol corresponding to the CP symbol and the first symbol can be received and the reception energy of the symbols in the latter half of the blocks such as the sixth and seventh symbols also increases compared to that in FIG. 7(*a*). However, when reception is carried out at an FFT timing later than this FIG. 7(*b*), the reception energy of the first symbol starts to be lost. Since the eighth symbol is repeated as a CP symbol at the head and symbol at the rear end, there is no energy loss of the eighth symbol.

On the other hand, as shown in FIG. 7(*c*), when the FFT timing is delayed by 2 symbols compared to FIG. 6(*a*), all the energy of the seventh and eighth symbols in the latter half of the blocks can be received, but even the main lobe of the first symbol and the second symbol cannot be received.

As shown in FIG. 7(*d*), when reception is carried out at a timing earlier by 1 symbol than FIG. 7(*c*), all the energy of the eighth symbol corresponding to the CP symbol and the seventh symbol can be received and the reception energy of symbols in the first half of the blocks such as the first and second symbols also increases compared to FIG. 7(*c*). However, when reception is carried out at an FFT timing earlier than this FIG. 7(*d*), the reception energy of the seventh symbol starts to be lost.

From the standpoint of symmetry, a timing intermediate between the FFT timing in FIG. 7(*b*) and FFT timing in FIG. 7(*d*) becomes an optimal FFT timing that suppresses energy loss most. More generally, when a timing at the center between the start timing $t_{first}$ (see FIG. 7(*a*)) of the waveform spread of the head symbol (first symbol) in the blocks except the CP symbol and the rear end timing $t_{last}$ (see FIG. 7(*a*)) of the waveform spread of the rear end symbol (e.g., seventh symbol) in the blocks except the symbol repeated as the CP symbol is defined as a timing $t_{mid}$ (see FIG. 7(*a*)) and a timing at the center of the FFT section is defined as $t_{rx}$ (see FIG. 7(*a*)), a timing at which $t_{rx}$ matches $t_{mid}$ is the optimal FFT timing. That is, the timing enclosed by the dotted line in FIG. 6(*a*) is the optimal FFT timing.

The optimal FFT timing has been shown by taking the symbol rate r in FIG. 6(*a*) as an example so far, and the optimal FFT timings at other symbol rates will be shown as follows.

FIG. 6(*b*) illustrates the optimal FFT timing of the blocks transmitted by the terminal apparatus at a symbol rate 2r (see FIG. 2(b)). From a standpoint similar to that in FIG. 6(a), it is appreciated that the timing enclosed by the dotted line in FIG. 6(b), that is, the timing later by $\Delta t_{compL}$ than FIG. 6(a) is the optimal FFT timing.

FIG. 6(c) illustrates the optimal FFT timing of the blocks transmitted by the terminal apparatus at a symbol rate 4r (see FIG. 2(c)). From a standpoint similar to that in FIG. 6(a), it is appreciated that the timing enclosed by the dotted line in FIG. 6(c), that is, the timing later by $\Delta t_{compL}+\Delta t_{compH}$ than FIG. 6(a) is the optimal FFT timing.

Here, the blocks in FIG. 6(a), FIG. 6(b) and FIG. 6(c) have the same CP length, the same block length and only differ in symbol rates. When blocks having different symbol rates are transmitted at the same transmission timing, signals at the respective blocks are sent through the same transmission path and subjected to FFT at the same timing, even if the blocks are subjected to FFT at an optimal timing for a block at a certain symbol rate, the timing is not the optimal FFT timing for the blocks at other symbol rates. Therefore, if the terminal apparatus advances or delays the transmission timing according to the symbol rate or the base station receives signals at the same timing irrespective of the symbol rate, the base station can perform FFT on the blocks at the respective symbol rates at their respective optimal timings.

For example, suppose the terminal apparatus transmits a block at a symbol rate 2r to the base station at a first time and the base station receives the block at an optimal FFT timing. The optimal FFT timing may also be realized by the base station reporting timing information (feedback information) on a timing to the terminal apparatus beforehand and the terminal apparatus adjusting the transmission timing based on this timing information or by the base station side adjusting the FFT timing. When the terminal apparatus transmits a block at a symbol rate r to the base station at a second time after the first time, if the terminal apparatus transmits the block at a timing later by $\Delta t_{compL}$ than the timing at which the terminal apparatus transmits the block at the symbol rate 2r and the base station side performs FFT at the same timing as that of the block at the symbol rate 2r, it is possible to perform FFT on the block at the symbol rate r at an optimal timing. When the terminal apparatus transmits a block at a symbol rate 4r to the base station at a third time after the second time, if the terminal apparatus transmits the block at a timing earlier by $\Delta t_{compL}+\Delta t_{compH}$ than the timing at which the terminal apparatus transmits the block at the symbol rate r and the base station side performs FFT at the same timing as that of the block at the symbol rate r, it is possible to perform FFT on the block at the symbol rate 4r at an optimal timing.

Figure 8:
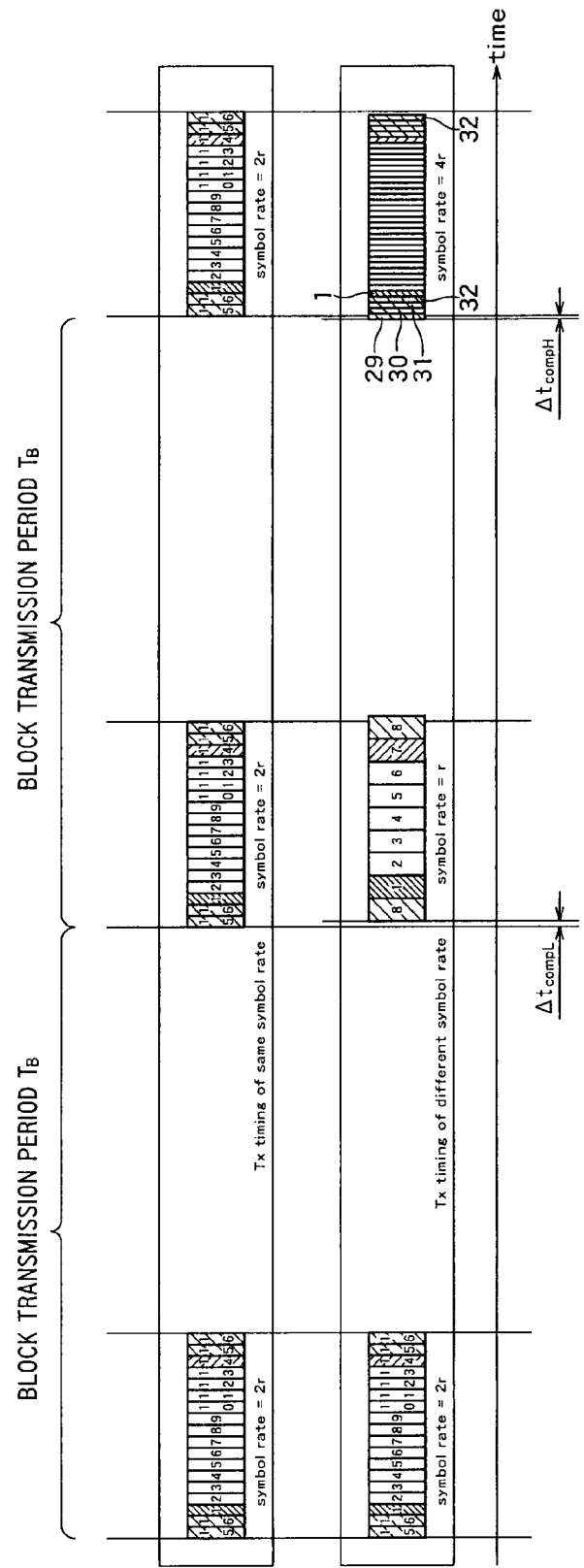
FIG. 8 shows transmission timing control according to a symbol rate.

FIG. 8 shows optimal transmission timings when the respective blocks are transmitted at the symbol rate r, symbol rate 2r and symbol rate 4r in the above described examples.

Suppose the terminal apparatus transmits the block at the symbol rate 2r to the base station and the base station performs FFT at an optimal timing. Suppose the block transmission period is $T_B$. When the terminal apparatus continues transmission at the same symbol rate 2r, if the base station continues reception at the block period $T_B$, it is possible to continue to receive the block at the symbol rate 2r at the optimal FFT timing. On the other hand, when the terminal apparatus reduces the symbol rate (to r in this example), if the terminal apparatus delays the transmission timing by $\Delta t_{compL}$ and the base station continues reception at the block period $T_B$, it is possible to continue reception at the optimal FFT timing. Furthermore, when the symbol rate is increased (to 4r in this example), if the terminal apparatus advances the transmission timing by $\Delta t_{compH}$ and the base station continues reception at the block period $T_B$, it is possible to continue reception at the optimal FFT timing.

The above explanations are based on the case where the transmission path transmits one signal but the same applies to a multipath environment. In the case of a multipath environment made up of a plurality of n (n>2) signals, when attention is focused on only the kth (1=<k=<n) signal, the same thing as that in the case where the transmission path transmits one signal is applied and the multipath environment can be expressed by a linear addition from the first to nth signals. Therefore, the above described explanations are commonly applicable to general propagation environments.

As described above, according to this embodiment, the transmission timing is advanced as the symbol rate of the block to be transmitted increases and the transmission timing is delayed as the symbol rate decreases, and therefore when the symbol rate is changed, the time until the base station realizes an optimal FFT timing can be shortened.

Second Embodiment

Figure 9:
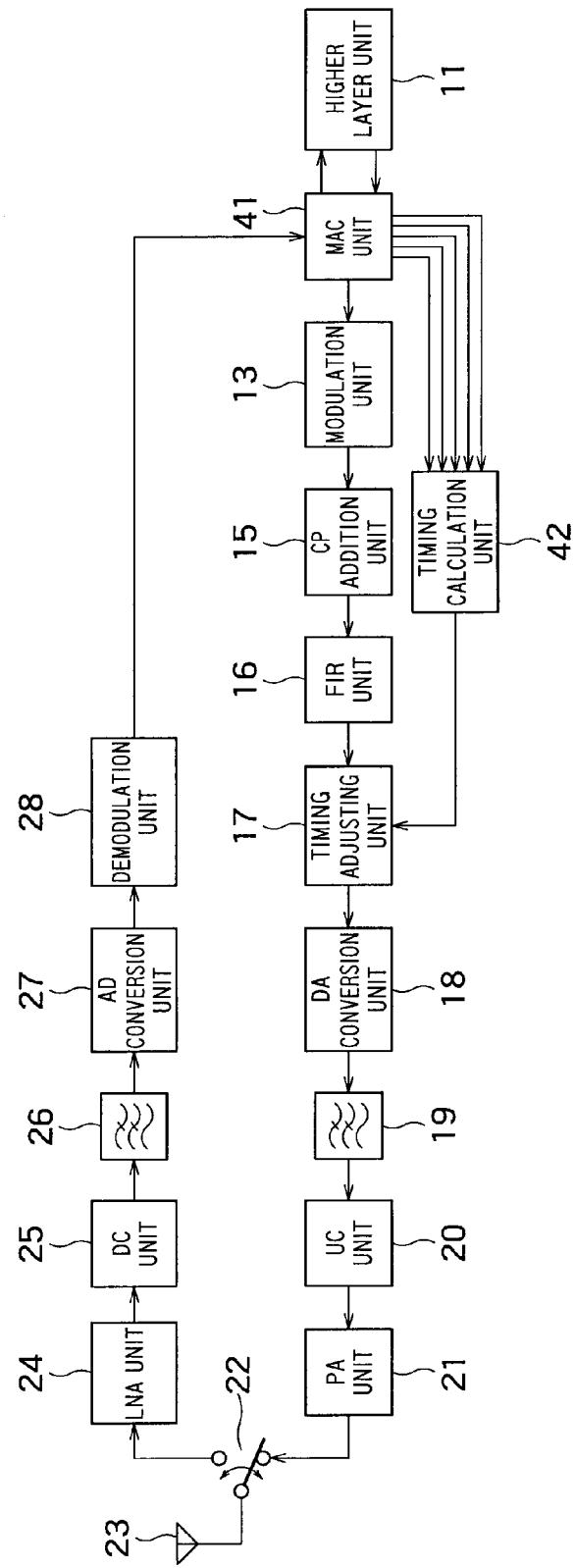
FIG. 9 is a block diagram showing the configuration of a terminal apparatus according to a second embodiment.

FIG. 9 is a block diagram showing the configuration of a terminal apparatus according to a second embodiment. FIG. 9 is different from FIG. 4 in the operations of the MAC unit and timing calculation unit and is the same as FIG. 4 in other blocks, and therefore explanations thereof will be omitted here.

A MAC unit 41 performs processing on a MAC layer, outputs information to be transmitted to a modulation unit 13 and outputs symbol rate information indicating a current symbol rate, timing information reported from a base station, the number of current CP symbols, initial symbol rate information indicating a symbol rate (initial symbol rate) of a block transmitted to the base station for initial timing synchronization and the number of CP symbols (number of initial CP symbols) in the block transmitted by the terminal apparatus for initial timing synchronization to a timing calculation unit 42.

The timing calculation unit 42 calculates transmission timing information based on these pieces of information inputted from the MAC unit 41 and outputs the calculated timing information to a timing adjusting unit 17.

Figure 10:
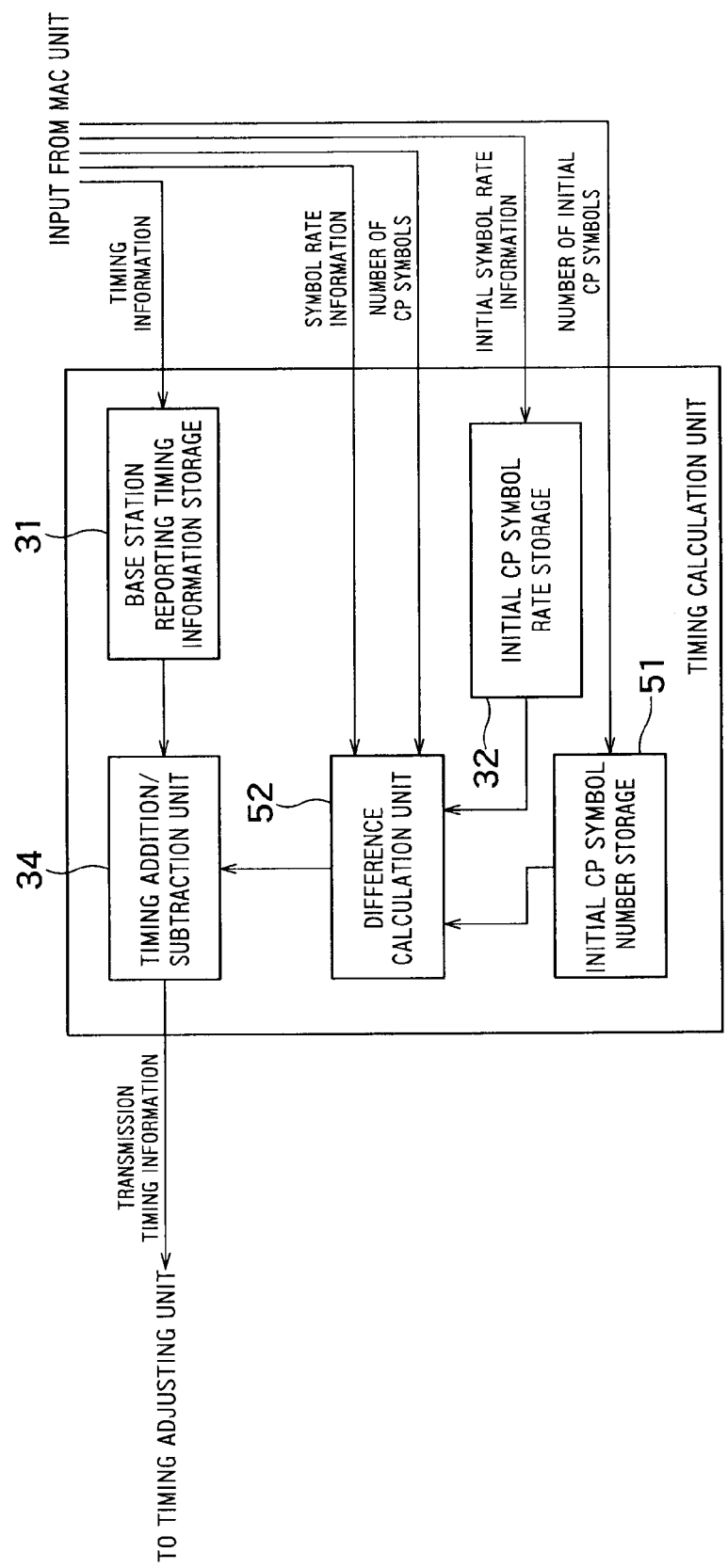
FIG. 10 is a block diagram showing the configuration of a timing calculation unit according to the second embodiment.

FIG. 10 is a block diagram showing the configuration of the timing calculation unit 42.

Since a base station reporting timing information storage 31, initial symbol rate storage 32 and timing addition/subtraction unit 34 are the same as those in FIG. 5, explanations thereof will be omitted here.

An initial CP symbol number storage 51 stores the number of initial CP symbols inputted from the MAC unit 41.

A difference calculation unit 52 receives the number of initial CP symbols from the initial CP symbol number storage 51 and also receives the initial symbol rate information from the initial symbol rate storage 32. Furthermore, the difference calculation unit 52 receives the current symbol rate information and the number of current CP symbols from the MAC unit 41. Assuming the number of initial CP symbols is $S_{ini}$, initial symbol rate is $r_{ini}$, current symbol rate is $r_{now}$ and the number of current CP symbols is $S_{now}$, the difference calculation unit 52 calculates $\Delta t_{compO}$ and outputs the calculated $\Delta t_{compO}$ to the timing addition/subtraction unit 34.

$$\Delta t_{compO} = \frac{S_{ini}-1}{2} \cdot \frac{1}{r_{ini}} - \frac{S_{now}-1}{2} \cdot \frac{1}{r_{now}} \qquad \text{[Expression 2]}$$

The derivation of the above described expression will be explained. As explained in the first embodiment, when a timing at the center between a start timing $t_{first}$ of the spread of the waveform of the head symbol in the block except the CP symbol and a rear end timing $t_{last}$ of the spread of the waveform of the rear end symbol in the block except symbols repeated in the CP symbol is timing $t_{mid}$, and the center timing in the FFT section is $t_{rx}$, the timing at which $t_{rx}$ matches $t_{mid}$ is an optimal FFT timing. The start timing $t_{first}$ of the spread of the waveform of the head symbol in the block except the CP symbol is expressed by:

$$t_{first} = \left(S(r) - \frac{F}{2}\right)\frac{1}{r} \qquad \text{[Expression 3]}$$

Here, "r" denotes a symbol rate, "S(r)" denotes the number of CP symbols when symbol rate r, "F" denotes a width of spread of the transmission waveform of a band limitation filter (corresponds to the FIR unit in FIG. 9) expressed with the symbol number. The rear end timing $t_{last}$ of the spread of the waveform of the rear end symbol in the block except symbols repeated in the CP symbol is expressed by:

$$t_{last} = \left(T_{Bdata} - \frac{1}{r}\right) + \frac{F}{2} \cdot \frac{1}{r} \qquad \text{[Expression 4]}$$

Here, "$T_{Bdata}$" denotes a block length except the CP length (that is, FFT section length). Therefore, $t_{mid}$ is expressed by:

$$t_{mid} = \frac{t_{first} + t_{last}}{2} = \frac{1}{2}\left[(S(r) - 1) \cdot \frac{1}{r} + T_{Bdata}\right] \qquad \text{[Expression 5]}$$

The relationship between FFT start timing $t_s$ and $t_{rx}$ is expressed by:

$$t_{rx} = t_s + \frac{T_{Bdata}}{2} \qquad \text{[Expression 6]}$$

Since the timing at which $t_{rx} = t_{mid}$ is the optimal FFT timing, $$\frac{1}{2}\left[(S(r) - 1) \cdot \frac{1}{r} + T_{Bdata}\right] = t_s + \frac{T_{Bdata}}{2} \qquad \text{[Expression 7]}$$

$$t_s = \frac{S(r) - 1}{2} \cdot \frac{1}{r}$$

The difference $\Delta t_s$ in optimal FFT timing between the symbol rate $r_1$ and symbol rate $r_2$ can be calculated as follows.

$$\Delta t_s = \frac{S(r_1) - 1}{2} \cdot \frac{1}{r_1} - \frac{S(r_2) - 1}{2} \cdot \frac{1}{r_2} \qquad \text{[Expression 8]}$$

The above described derivation applies to the case where the number of CP symbols is uniquely determined by the symbol rate, but similar derivation is likewise applicable to a case where the number of CP symbols does not depend on the symbol rate.

In the above explanation, the initial symbol rate $r_{ini}$ corresponds to a value $r_x$ of a certain Xth symbol rate which is a predetermined symbol rate as a reference and the number of initial CP symbols $S_{ini}$ corresponds to the number of repetition symbols $S_x$ included, for example, in the block of the Xth symbol rate. The current symbol rate $r_{now}$ corresponds to the value $r_2$ of the second symbol rate which is, for example, a changed symbol rate, and the number of current CP symbols $S_{now}$ corresponds, for example, to the number of repetition symbols $S_2$ included in the block of the second symbol rate.

As is also understandable from the above described calculation expression of $\Delta t_{comp0}$, the timing calculation unit 42 determines, when $(S_{now}-1)/r_{now}$ is greater than $(S_{ini}-1)/r_{ini}$, the transmission timing at the current (e.g., changed) symbol rate so that the transmission timing becomes earlier than the transmission timing at the initial symbol rate as the absolute value of the difference between these values increases, and determines, when $(S_{ini}-1)/r_{ini}$ is greater than $(S_{now}-1)/r_{now}$, the transmission timing at the current (e.g., changed) symbol rate so that the transmission timing becomes later than the transmission timing at the initial symbol rate as the absolute value of the difference between these values increases. Suppose the transmission timing is not changed when $(S_{now}-1)/r_{now}$ is equal to $(S_{ini}-1)/r_{ini}$.

Third Embodiment

Figure 11:
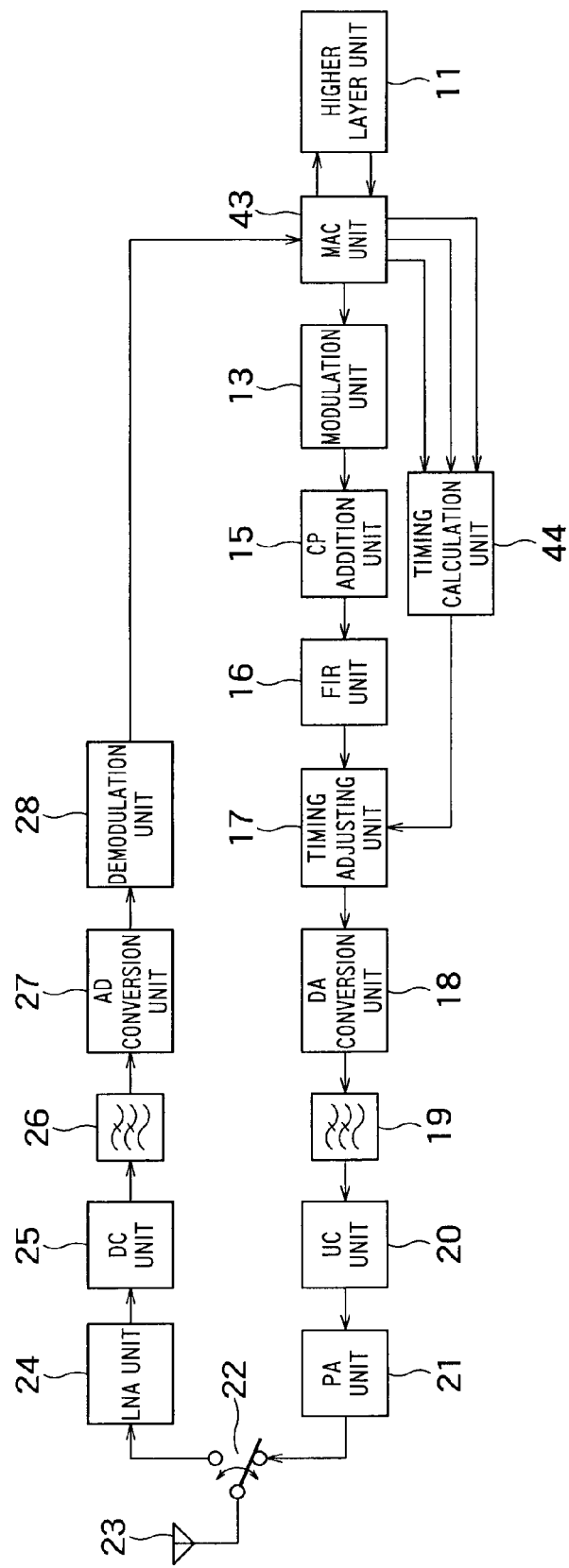
FIG. 11 is a block diagram showing the configuration of a terminal apparatus according to a third embodiment.

FIG. 11 is a block diagram showing the configuration of a terminal apparatus according to a third embodiment. FIG. 11 is different from FIG. 9 in the operations of the MAC unit and timing calculation unit and is the same as FIG. 9 in other blocks, and therefore explanations thereof will be omitted here.

A MAC unit 43 performs processing on a MAC layer, outputs information to be transmitted to a modulation unit 13 and outputs current symbol rate information, timing information reported from a base station and the number of current CP symbols to a timing calculation unit 44.

The timing calculation unit 44 calculates transmission timing information based on the symbol rate information, timing information and number of CP symbols inputted from the MAC unit 43 and outputs the calculated transmission timing information to a timing adjusting unit 17.

Figure 12:
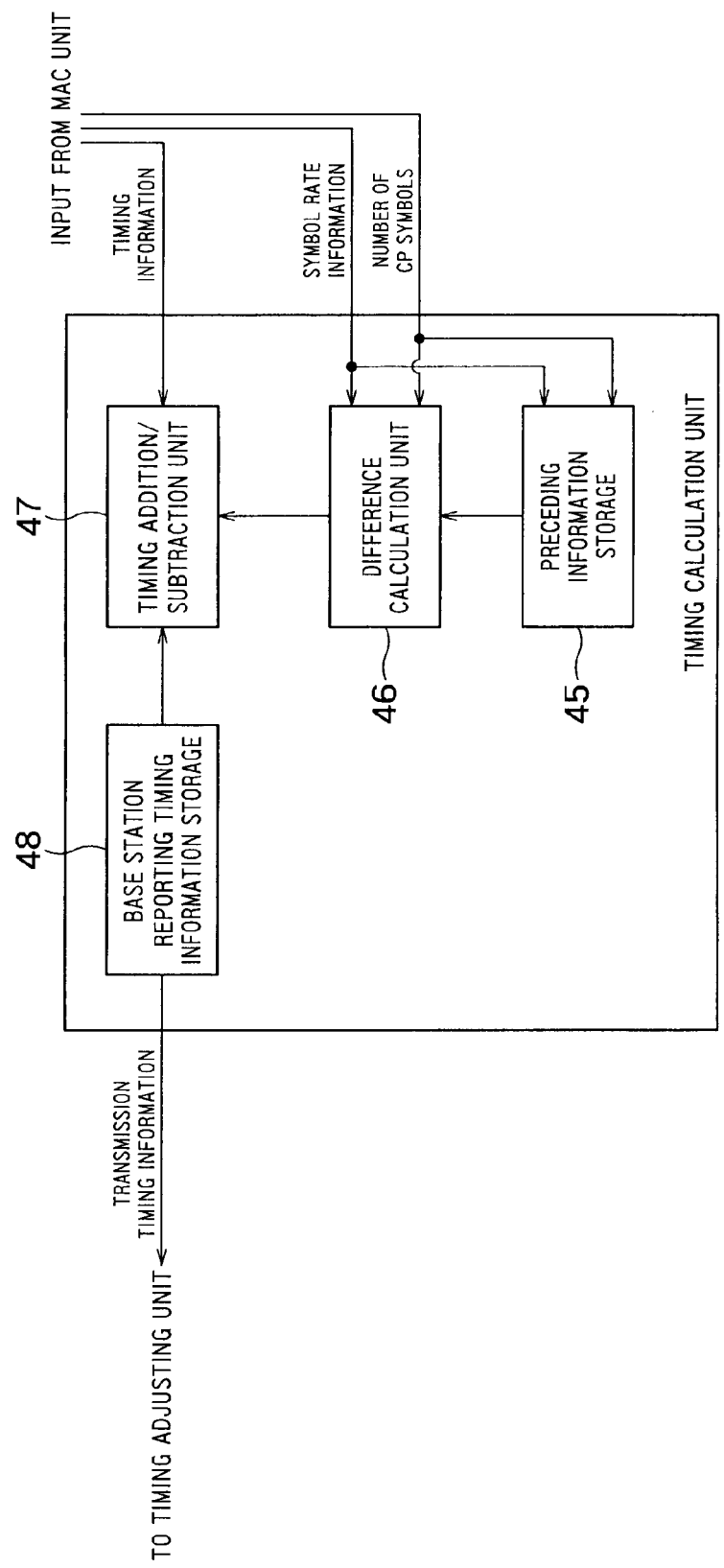
FIG. 12 is a block diagram showing the configuration of a timing calculation unit according to a third embodiment.

FIG. 12 is a block diagram showing the configuration of the timing calculation unit 44.

A preceding information storage 45 stores symbol rate information and the number of CP symbols of the immediately preceding block (or immediately preceding transmission slot). When the symbol rate information and the number of CP symbols are inputted from the MAC unit 43, the preceding information storage 45 outputs the symbol rate information and the number of CP symbols of the immediately preceding block (immediately preceding transmission slot) stored in a memory in the preceding information storage 45 to a difference calculation unit 46 and stores the symbol rate information and the number of CP symbols inputted from the MAC unit 43 in the memory in the preceding information storage 45.

The difference calculation unit 46 receives the symbol rate information and the number of CP symbols $S_{now}$ from the MAC unit 43 as input and receives the symbol rate information and the number of CP symbols $S_{pre}$ of the immediately preceding block (or immediately preceding transmission slot) from the preceding information storage 45 as input. The difference calculation unit 46 calculates $\Delta t_{comp0}$ from the current symbol rate $r_{now}$, symbol rate $r_{pre}$ of the immediately preceding block (or immediately preceding transmission slot), the current number of CP symbols $S_{now}$ and the number of CP symbols $S_{pre}$ of the immediately preceding block (or immediately preceding transmission slot) according to the following expression.

$$\Delta t_{comp0} = \frac{S_{pre} - 1}{2} \cdot \frac{1}{r_{pre}} - \frac{S_{now} - 1}{2} \cdot \frac{1}{r_{now}} \quad \text{[Expression 9]}$$

The difference calculation unit 46 outputs this $\Delta t_{comp0}$ to a timing addition/subtraction unit 47.

The timing addition/subtraction unit 47 adds up the timing information $\Delta t_{cs}$ inputted from the MAC unit 43 and $\Delta t_{comp0}$ inputted from the difference calculation unit 46 and outputs $\Delta t_{out1} = \Delta t_{cs} + \Delta t_{comp0}$ which is the result thereof to a base station reporting timing information storage 48 as transmission timing information. The timing information $\Delta t_{cs}$ is reported from the base station at the time of initial timing synchronization, at a predetermined time period or when the base station judges it necessary and $\Delta t_{cs}=0$ is judged to have been inputted when nothing is inputted.

The base station reporting timing information storage 48 receives timing information $\Delta t_{out}$ from the timing addition/subtraction unit 47 as input, for example, for each transmission slot. The base station reporting timing information storage 48 stores a cumulative sum of the timing information $\Delta t_{out1}$ inputted after a communication is started. That is, when the transmission timing at which nth data is inputted after the communication is started is assumed to be $\Delta t_{out1}(n)$, the stored value $\Delta t_{out2}$ stored in the base station reporting timing information storage 48 is expressed by:

$$\Delta t_{out2} = \sum_{k=1}^{n} \Delta t_{out1}(k) \quad \text{[Expression 10]}$$

The base station reporting timing information storage 48 outputs this stored value $\Delta t_{out2}$ to the timing adjusting unit 17 as transmission timing information.

In the above explanation, the symbol rate $r_{pre}$ corresponds to the Xth symbol rate $r_x$ which is the symbol rate immediately before being changed, for example, to the second symbol rate and the number of CP symbols $S_{pre}$ corresponds, for example, to the number of repetition symbols $S_x$ included in the block of the Xth symbol rate. Furthermore, the current symbol rate $r_{now}$ corresponds, for example, to the value of the second symbol rate $r_2$ which is the changed symbol rate and the current number of CP symbols $S_{now}$ corresponds, for example, to the number of repetition symbols $S_2$ included in the block of the second symbol rate.

As is also understandable from the calculation expression of $\Delta t_{comp0}$, when $(S_{now}-1)/r_{now}$ is greater than $(S_{pre}-1)/r_{pre}$, the timing calculation unit 44 determines the transmission timing at the changed symbol rate so that the transmission timing becomes earlier than the transmission timing at the immediately preceding symbol rate as the absolute value of the difference between these values increases, whereas when $(S_{pre}-1)/r_{pre}$ is greater than $(S_{now}-1)/r_{now}$, the timing calculation unit 44 determines the transmission timing at the changed symbol rate so that the transmission timing becomes later than the transmission timing at the immediately preceding symbol rate as the absolute value of the difference between these values increases. Suppose the transmission timing is not changed when $(S_{now}-1)/r_{now}$ is equal to $(S_{pre}-1)/r_{pre}$.

Fourth Embodiment

Figure 13:
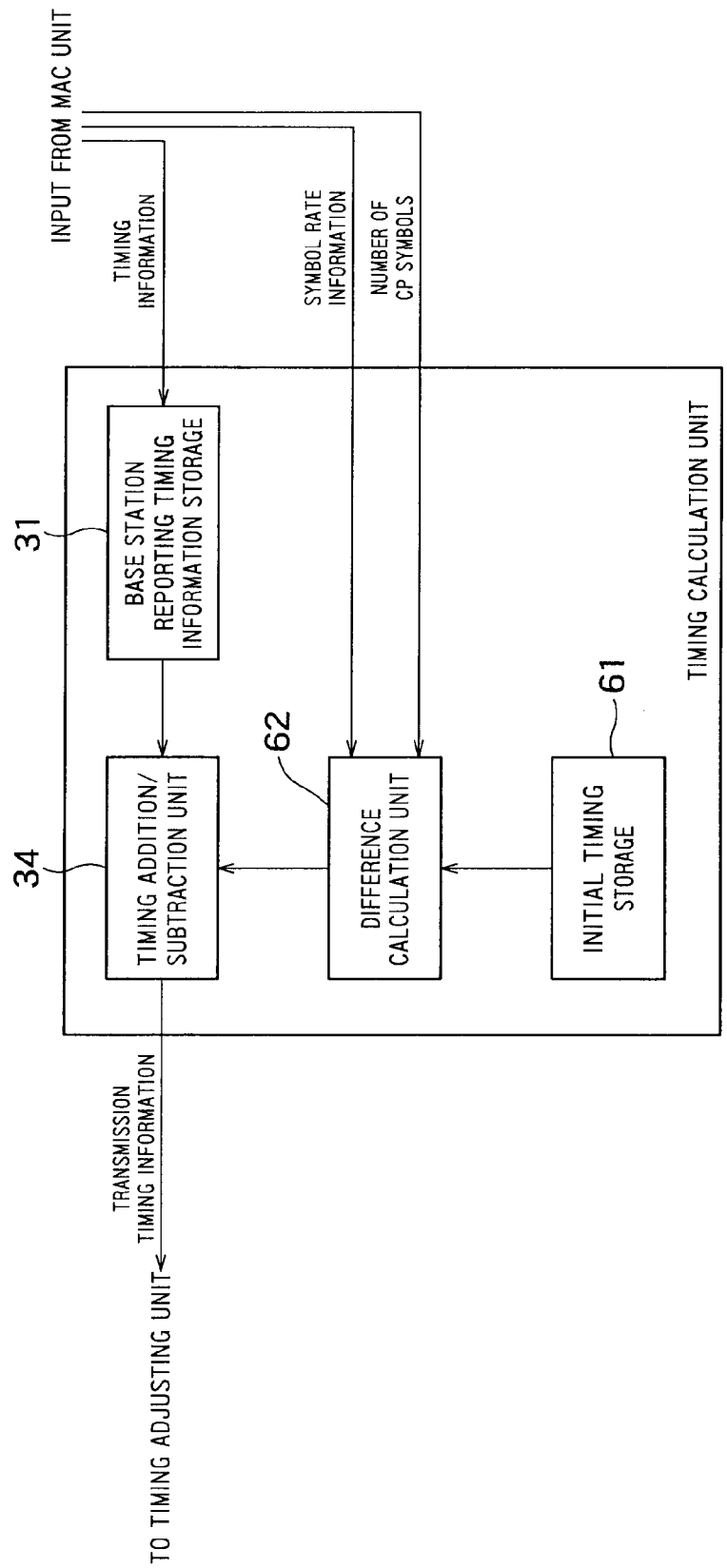
FIG. 13 is a block diagram showing the configuration of a timing calculation unit of a terminal apparatus according to a fourth embodiment.

FIG. 13 is a block diagram showing the configuration of a timing calculation unit of a terminal apparatus according to a fourth embodiment.

Since a base station reporting timing information storage 31 and a timing addition/subtraction unit 34 are similar to those in FIG. 5, explanations thereof will be omitted here.

An initial timing storage 61 stores a value corresponding to:

$$t_{pre} = \frac{S_{ini} - 1}{2} \cdot \frac{1}{r_{ini}} \quad \text{[Expression 11]}$$

However, suppose the number of CP symbols of a transmission block used for initial timing synchronization is $S_{ini}$, the initial symbol rate is $r_{ini}$ and the number of CP symbols $S_{ini}$ and initial symbol rate $r_{ini}$ are predetermined fixed values.

A difference calculation unit 62 receives the current symbol rate information and the number of current CP symbols $S_{now}$ from the MAC unit as input and receives a value $t_{pre}$ from the initial timing storage 61 as input. The difference calculation unit 62 calculates $\Delta t_{comp0}$ from the current symbol rate $r_{now}$, the number of current CP symbols $S_{now}$ and the value $t_{pre}$ stored in the initial timing storage 61 according to the following expression.

$$\Delta t_{comp0} = t_{pre} - \frac{S_{now} - 1}{2} \cdot \frac{1}{r_{now}} \quad \text{[Expression 12]}$$

The difference calculation unit 62 outputs this $\Delta t_{comp0}$ to the timing addition/subtraction unit 34.

In this way, when the number of CP symbols of the transmission block used for initial timing synchronization and the initial symbol rate are predetermined, it is possible to simplify the calculation in the timing calculation unit. The block diagram showing the configuration of the terminal apparatus according to this embodiment corresponds to FIG. 9 without the inputs of the initial symbol rate information and the number of initial CP symbols from the MAC unit 41 to the timing calculation unit.

Fifth Embodiment

Figure 14:
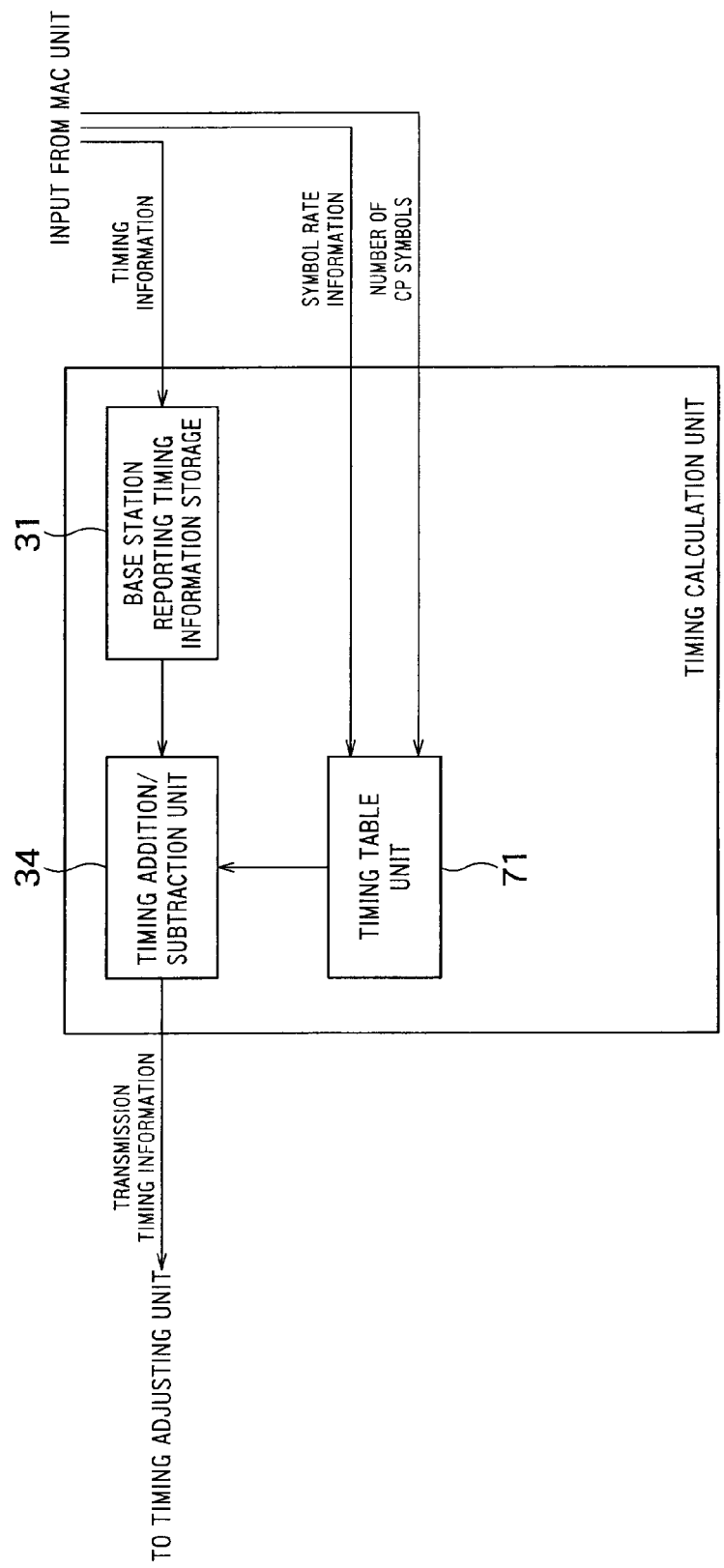
FIG. 14 is a block diagram showing the configuration of a timing calculation unit of a terminal apparatus according to a fifth embodiment.

FIG. 14 is a block diagram showing the configuration of a timing calculation unit of a terminal apparatus according to a fifth embodiment.

Since a base station reporting timing information storage 31 and a timing addition/subtraction unit 34 are similar to those in FIG. 5 and therefore explanations thereof will be omitted here.

A timing table unit 71 has a table that stores $\Delta t_{comp0}$ about all combinations of symbol rates and the number of CP symbols. However, in this embodiment, suppose the number of CP symbols $S_{ini}$ of the transmission block used for initial timing synchronization and initial symbol rate $r_{ini}$ are fixed values predetermined by the system.

The timing table unit 71 reads $\Delta t_{comp0}$ by referencing the table using the symbol rate information inputted from the MAC unit and the number of CP symbols as parameters and outputs the read $\Delta t_{comp0}$ to the timing addition/subtraction unit 34.

When the number of types of symbol rate and the number of CP symbols adopted for the transmission block are finite, the combination thereof is also finite. Therefore, if $\Delta t_{comp0}$ about all combinations of symbol rates and the number of CP symbols is stored in the table, calculations in the timing calculation unit can be simplified. As $\Delta t_{comp0}$ stored in the table, for example, values obtained from the expressions explained in the second embodiment and fourth embodiment may be used but the values need not always match the values explained in the second embodiment and fourth embodiment and values within a range not considerably departing from the values in the above described expression may also be used by taking the reception timing margin and mounting errors at the base station into consideration.

In addition to the above described values, the second embodiment may also be adapted so as to calculate $\Delta t_{comp0}$ beforehand according to each combination of the number of initial CP symbols $S_{ini}$, initial symbol rate $r_{ini}$, current symbol rate $r_{now}$ and the number of current CP symbols $S_{now}$, store the calculated value in the table in association with each combination and read $\Delta t_{comp0}$ by referencing the table using the number of initial CP symbols $S_{ini}$, initial symbol rate $r_{ini}$, current symbol rate $r_{now}$, the number of current CP symbols $S_{now}$ as parameters.

Furthermore, the third embodiment may also be adapted so as to calculate $\Delta t_{comp0}$ beforehand in accordance with each combination of the current symbol rate $r_{now}$, the number of current CP symbols $S_{now}$, symbol rate $r_{pre}$ of the immediately preceding block (or immediately preceding transmission slot), the number of CP symbols $S_{pre}$ of the immediately preceding block (or immediately preceding transmission slot), store the calculated values in the table in association with each calculated value and read $\Delta t_{comp0}$ by referencing the table using the current symbol rate $r_{now}$, the number of current CP symbols $S_{now}$, the symbol rate $r_{pre}$ of the immediately preceding block (or immediately preceding transmission slot), the number of CP symbols $S_{pre}$ of the immediately preceding block (or immediately preceding transmission slot) as parameters.

Sixth Embodiment

Figure 15:
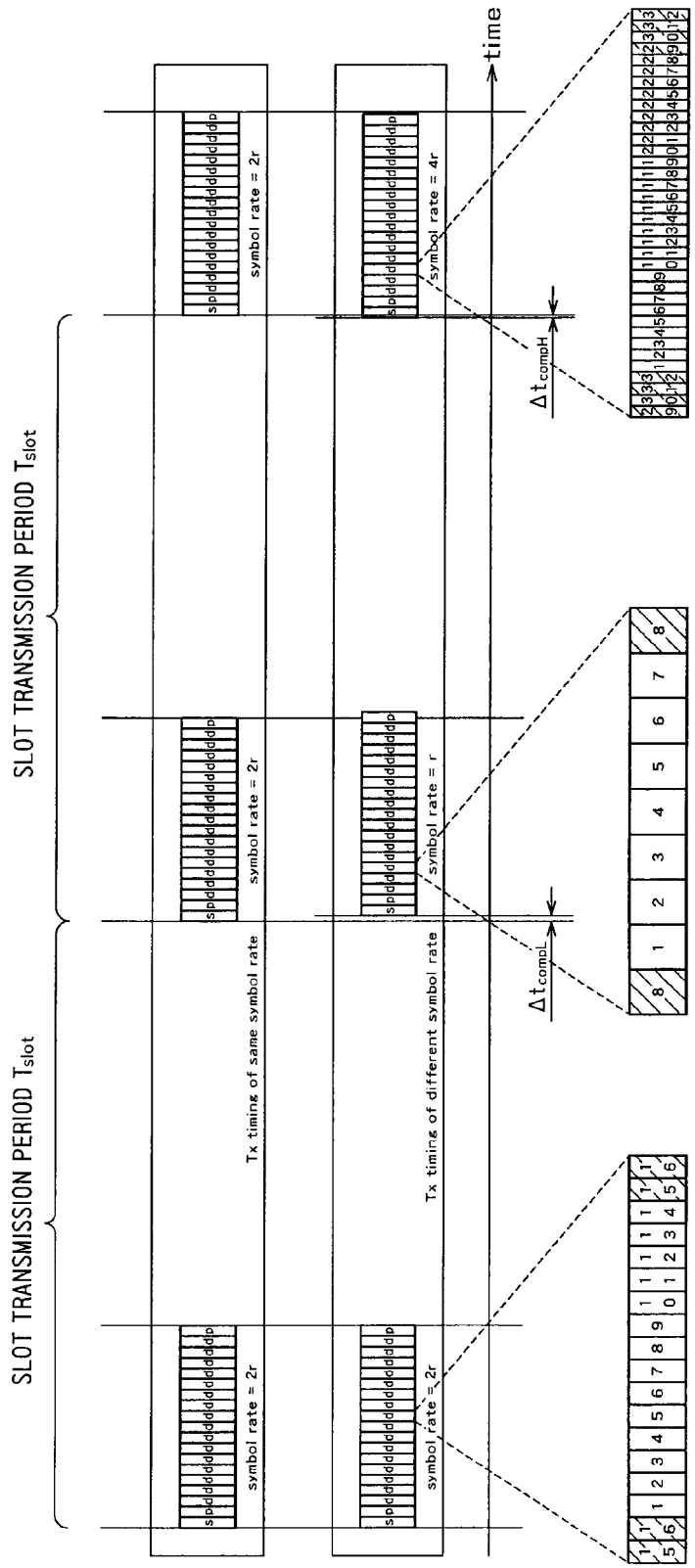
FIG. 15 illustrates transmission timing control when a terminal apparatus carries out transmission in slot units.

FIG. 15 illustrates an example of transmission timing control when a terminal apparatus carries out transmission in slot units.

In the example of FIG. 15, one slot consists of one sync block(s), two pilot blocks (p) and sixteen data blocks (d). Each block is made up of a number of symbols which varies from one symbol rate to another, but the symbol rates of all blocks included in one slot are the same. The terminal apparatus transmits slots for every slot transmission period $T_{slot}$, transmits slots at relatively the same slot timing when the transmission symbol rate of each slot and the CP length are the same, carries out the transmission timing control explained in the first to fifth embodiments when one or both of the transmission symbol rate and CP length is/are changed and carries out transmission at the adjusted slot timing.

Furthermore, when the terminal apparatus is reported from the base station to change the transmission timing by $\Delta t_{Bs}$ (not shown) during the transmission slot, suppose a change by $\Delta t_{Bs}$ is further added to the transmission timing for the slot timing after transmission timing adjustment according to the CP length or symbol rate.

Seventh Embodiment

This embodiment will describe transmission timing control when a so-called extended CP (extended repetition symbol) is included in a block. Hereinafter, an extended CP will be explained briefly first and then transmission timing control according to this embodiment will be explained in detail.

Figure 16:
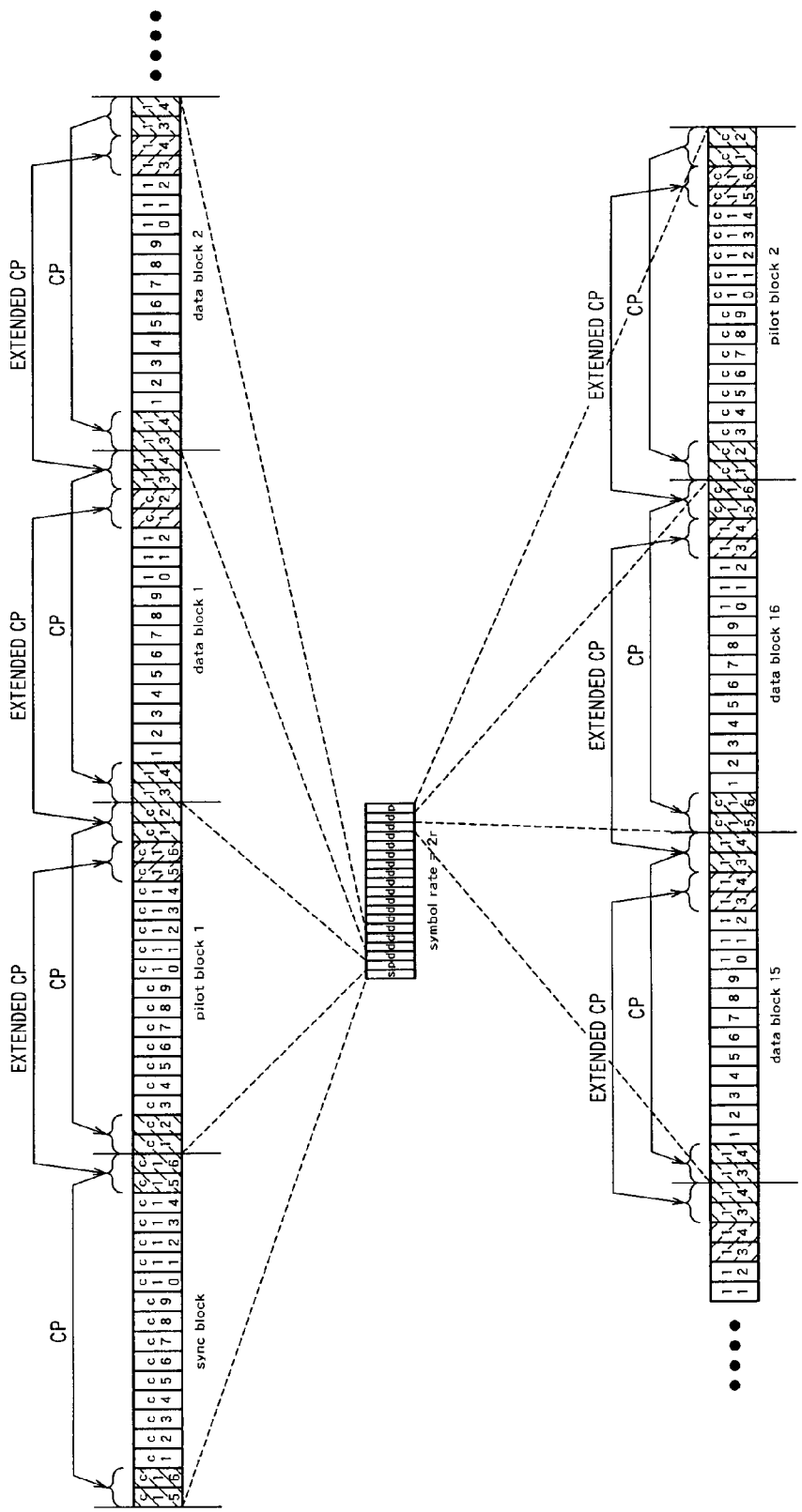
FIG. 16 shows an example of a case where two symbols are adopted as an extended CP.

FIG. 16 illustrates extended CPs.

When repetition symbols are added to the head side of a certain block, z (z is an integer equal to 1 or more) symbols preceding the symbol on the rear end side having the same waveform as the repetition symbols or z symbols preceding the repetition symbols on the rear end side when the repetition symbols is added to the rear end side are the same symbols having the same waveform as z symbols from the rear end symbol of the immediately preceding block, "extended CPs" refer to these z symbols in the certain block.

When the extended CPs are adopted, effects similar to those when the CP length is substantially extended can be expected. This example shows a case where two symbols are used as the extended CPs. For example, in a data block 1, two symbols preceding symbols 13 and 14 on the rear end side having the same waveform as repetition symbols (CP) on the head side are the same as two symbols c1 and c2 from the rear end of a pilot block 1 immediately preceding the data block 1 and these are therefore extended CPs.

When z extended CPs are used, for example, z symbols immediately preceding symbols repeated as CPs of each block depend on the immediately preceding block, and therefore, when extended CPs are adopted for known symbols as a pilot block, the portion corresponding to the extended CPs of the immediately preceding block (data block 2) (here last two c15 and c16 of the block) such as pilot block 2 in FIG. 16 need to match pilot block 2.

Furthermore, when a block consisting of known symbols are consecutively transmitted as in the case where a sync block and a pilot block are transmitted consecutively, extended CPs cannot be normally adopted for the above described reason. However, as shown in FIG. 16, by adopting a known symbol sequence made up of c1 to c16 symbols for synchronization symbols (sync block) and adopting a sequence resulting from cyclically shifting the known symbol sequence for a pilot block (pilot block 1), it is possible to adopt extended CPs.

Furthermore, the synchronization block at the head of the slot may be transmitted without adopting extended CPs or the CP length of the sync block may be simply extended. In the example of FIG. 16, the sync block is transmitted without adopting any extended CPs.

Figure 17:
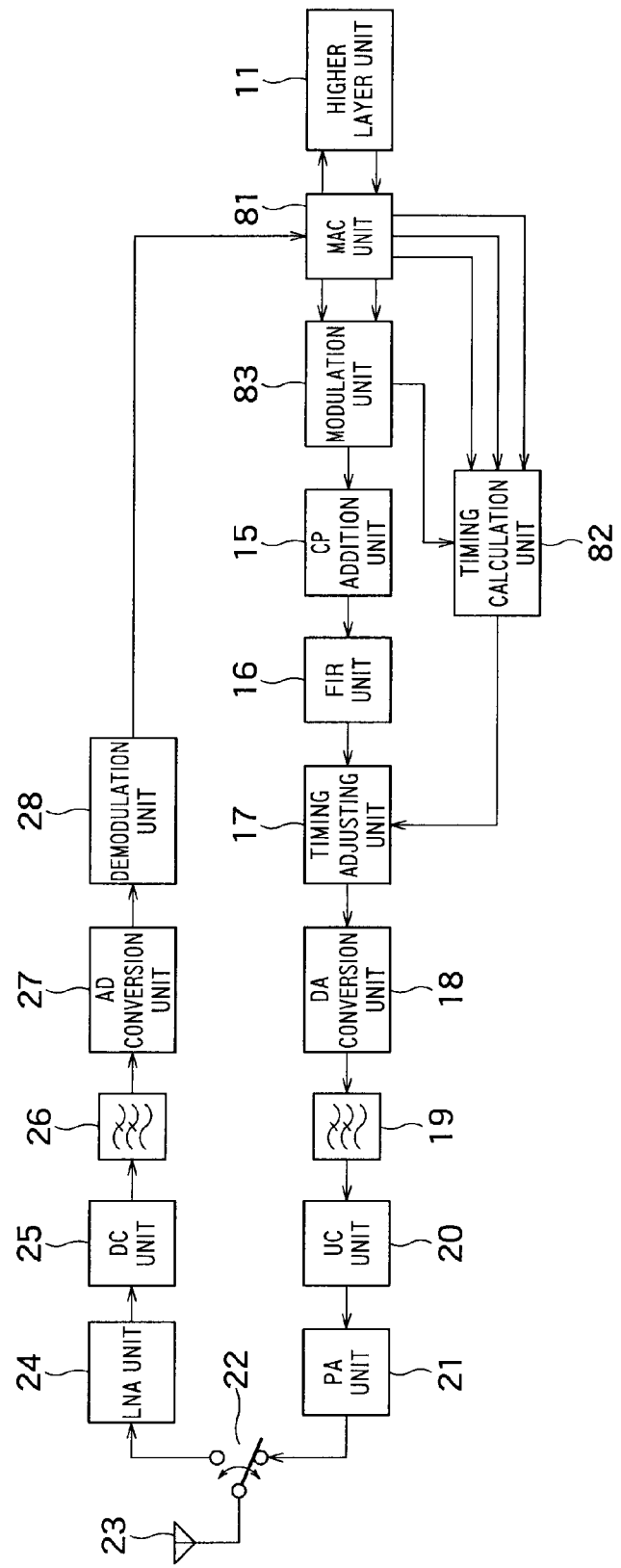
FIG. 17 is a block diagram showing the configuration of a terminal apparatus using an extended CP according to a seventh embodiment.

FIG. 17 is a block diagram showing the configuration of a terminal apparatus when extended CPs according to the seventh embodiment are used.

FIG. 17 differs from FIG. 4 in the operations of a MAC unit 81, a timing calculation unit 82 and a modulation unit 83 and is the same as FIG. 4 in other blocks, and therefore explanations thereof will be omitted.

The MAC unit 81 performs processing on a MAC layer, outputs information to be transmitted and information on extended CPs to the modulation unit 83 and also outputs symbol rate information, timing information reported from the base station and the number of CP symbols to the timing calculation unit 82.

The modulation unit 83 creates a digital baseband modulated signal including extended CPs based on the information inputted from the MAC unit 81, outputs the signal to a CP addition unit 15 and also outputs the number of extended CP symbols to the timing calculation unit 82.

The timing calculation unit 82 calculates transmission timing information based on the symbol rate information, timing information and the number of CP symbols inputted from the MAC unit 81 and the number of extended CP symbols inputted from the modulation unit 83 and outputs the calculated transmission timing information to a timing adjusting unit 17.

Figure 18:
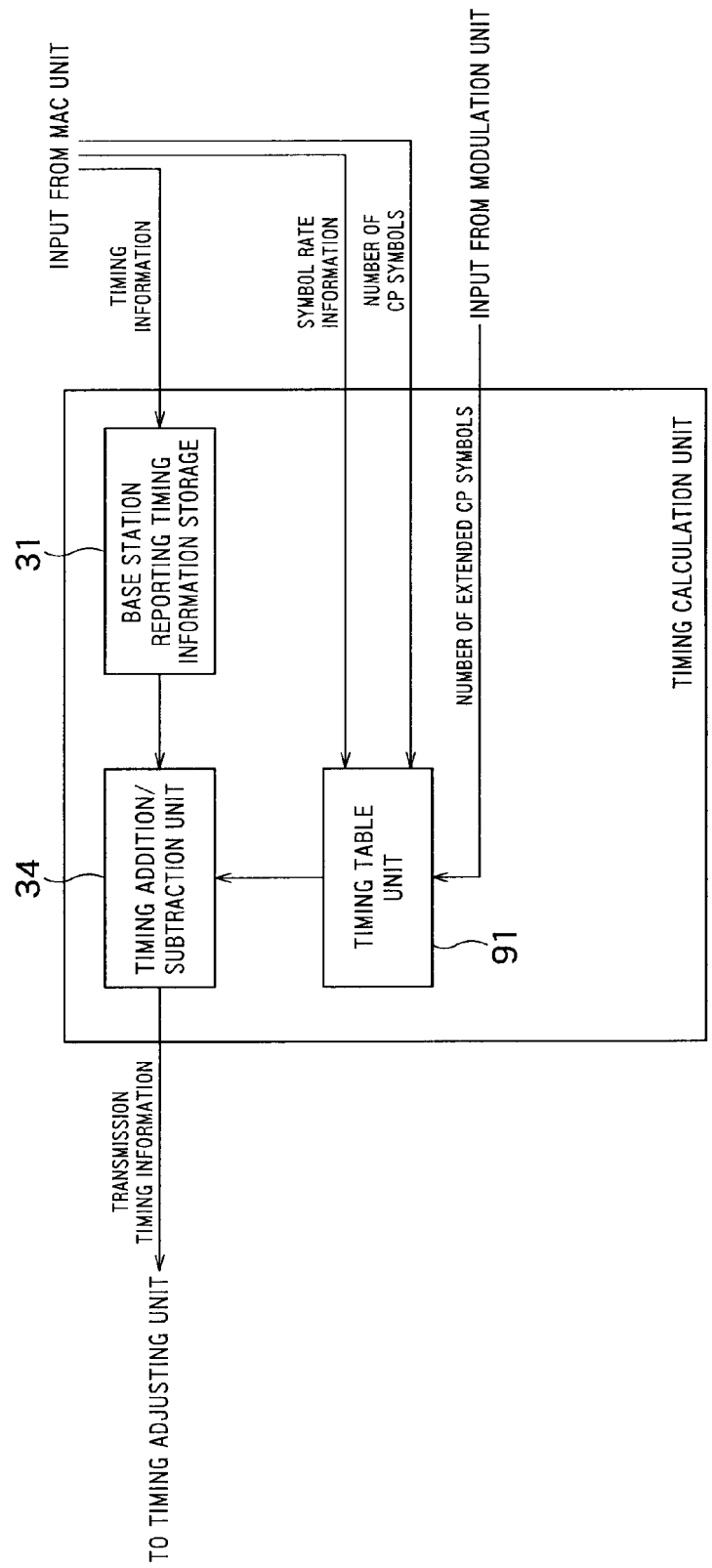
FIG. 18 is a block diagram showing the configuration of a timing calculation unit according to the seventh embodiment.

FIG. 18 is a block diagram showing the configuration of the timing calculation unit 82.

A base station reporting timing information storage 31 and a timing addition/subtraction unit 34 are similar to those in FIG. 5, and therefore explanations thereof will be omitted here.

A timing table unit 91 has a table storing $\Delta t_{comp0}$ regarding all combinations of symbol rates, the number of CP symbols and the number of extended CP symbols. A timing table unit 91 reads $\Delta t_{comp0}$ by referencing the table using the symbol rate information and the number of CP symbols inputted from the MAC unit 81 and the number of extended CP symbols inputted from the modulation unit 83 as parameters and outputs the read $\Delta t_{comp0}$ to the timing addition/subtraction unit 34.

When the types of symbol rates adopted by the transmission block, the number of CP symbols and the number of extended CP symbols are finite, combinations thereof are also finite. Therefore, values $\Delta t_{comp0}$ corresponding to all combinations of the respective symbol rates, respective numbers of CP symbols and respective numbers of extended CP symbols are stored in the table beforehand. The value $\Delta t_{comp0}$ is calculated by, for example, the following expression.

$$\Delta t_{comp0} = \frac{S_{ini}-1-S_{Vini}}{2} \cdot \frac{1}{r_{ini}} - \frac{S_{now}(r)-1-S_{Vnow}(r)}{2} \cdot \frac{1}{r} \quad \text{[Expression 13]}$$

Here, "$S_{ini}$" denotes the number of CP symbols of the transmission block used for initial timing synchronization, "$S_{Vini}$" denotes the number of extended CP symbols of the transmission block used for initial timing synchronization, "$r_{ini}$" denotes an initial symbol rate of the transmission block used for initial timing synchronization, "r" denotes a current symbol rate outputted from the MAC unit 81, "$S_{now}(r)$" denotes the number of current CP symbols outputted from the MAC unit 81, "$S_{Vnow}(r)$" denotes the number of current extended CP symbols outputted from the MAC unit 81. However, suppose the number of initial CP symbols $S_{ini}$, initial symbol rate $r_{ini}$ number of extended CP symbols $S_{Vini}$ are fixed values predetermined by the system.

The derivation of this expression can be obtained by replacing $t_{last}$ explained in the second embodiment by taking extended CPs into consideration.

$$t'_{last} = \left(T_{Bdata} - \frac{1}{r} - \frac{1}{r} \cdot S_{Vnow}(r)\right) + \frac{F}{2} \cdot \frac{1}{r} \quad \text{[Expression 14]}$$

In this embodiment, $\Delta t_{comp0}$ is calculated by referencing values of the table created beforehand but the present invention is not limited to this method and $\Delta t_{comp0}$ may also be calculated by directly calculating the above described expression. Furthermore, the value stored in the table need not always match the values in the above described expression and it is possible to apply values within a range that does not considerably depart from the value of the above described expression by taking a reception timing margin and mounting errors or the like in the base station into consideration.

In the above described expression, "r" corresponds to the value $r_2$ of the second symbol rate, "$S_{now}(r)$" corresponds to the number of repetition symbols $S_2$ included in the block of the second symbol rate and "$S_{Vnow}(r)$" corresponds to the number of extended repetition symbols $S_{v2}$ included in the block of the second symbol rate. Furthermore, "$r_{ini}$" corresponds to the value $r_x$ of the Xth symbol rate which is a predetermined symbol rate as a reference, "$S_{ini}$" corresponds to the number of repetition symbols $S_x$ included in the block of the Xth symbol rate, "$S_{Vini}$" corresponds to the number of extended repetition symbol $S_{vx}$ included in the block of the Xth symbol rate.

As is understandable from the above described calculation expression of $\Delta t_{comp0}$, the timing calculation unit 82 then determines, when $(S_{now}(r)-1-S_{Vnow}(r))/r$ is greater than $(S_{ini}-1-S_{Vini})/r_{ini}$, the transmission timing at the current (e.g., changed) symbol rate so that the transmission timing at the current (e.g., changed) symbol rate becomes earlier than the transmission timing at the initial symbol rate as the absolute value of the difference between these values increases and determines, when $(S_{ini}-1-S_{Vini})/r_{ini}$ is greater than $(S_{now}(r)-1-S_{Vnow}(r))/r$, the transmission timing at the current (e.g., changed) symbol rate so that the transmission timing at the current (e.g., changed) symbol rate becomes later than the transmission timing at the initial symbol rate as the absolute value of the difference between these values increases.

In the calculation of $\Delta t_{comp0}$, instead of the number of CP symbols $S_{ini}$ of the transmission block used for initial timing synchronization, number of extended CP symbols $S_{vini}$ of the transmission block used for initial timing synchronization and initial symbol rate $r_{ini}$ of the transmission block used for initial timing synchronization, it is possible to use the number of CP symbols and the number of extended CP symbols included in the block of the immediately preceding slot and the symbol rate of the immediately preceding slot as in the case of the third embodiment.

Furthermore, as described in the fifth embodiment, it is also possible to calculate $\Delta t_{comp0}$ beforehand in accordance with combinations of the number of initial CP symbols $S_{ini}$, initial symbol rate $r_{ini}$, number of extended CP symbols $S_{Vini}$, current symbol rate r, the number of current CP symbols $S_{now}(r)$ and number of extended CP symbols $S_{Vnow}(r)$, store the calculated values in association with the respective combinations in the table and read $\Delta t_{comp0}$ by referencing the table using the number of initial CP symbols $S_{ini}$, initial symbol rate $r_{ini}$, number of extended CP symbols $S_{Vini}$, current symbol rate r, the number of current CP symbols $S_{now}(r)$ and number of extended CP symbols $S_{Vnow}(r)$ as parameters.

Furthermore, it is also possible to calculate $\Delta t_{comp0}$ beforehand in accordance with combinations of current symbol rate r, number of current CP symbols Snow(r), number of extended CP symbols $S_{Vnow}(r)$, symbol rate of the immediately preceding block (or immediately preceding transmission slot), the number of CP symbols of the immediately preceding block (or immediately preceding transmission slot) and the number of extended CP symbols of the immediately preceding block (or immediately preceding transmission slot), store the calculated values in association with the respective combinations in the table and read $\Delta t_{comp0}$ by referencing the table using the current symbol rate r, the number of current CP symbols $S_{now}(r)$, number of extended CP symbols $S_{Vnow}(r)$, symbol rate of the immediately preceding block (or immediately preceding transmission slot), the number of CP symbols of the immediately preceding block (or immediately preceding transmission slot), number of extended CP symbols of the immediately preceding block (or immediately preceding transmission slot) as parameters.

Eighth Embodiment

This embodiment has a feature that a base station determines a transmission timing by taking influences of a symbol rate into consideration in addition to normal timing control and reports timing information (feedback information) indicating the determined transmission timing to a terminal apparatus. Hereinafter, this embodiment will be explained in detail.

Figure 19:
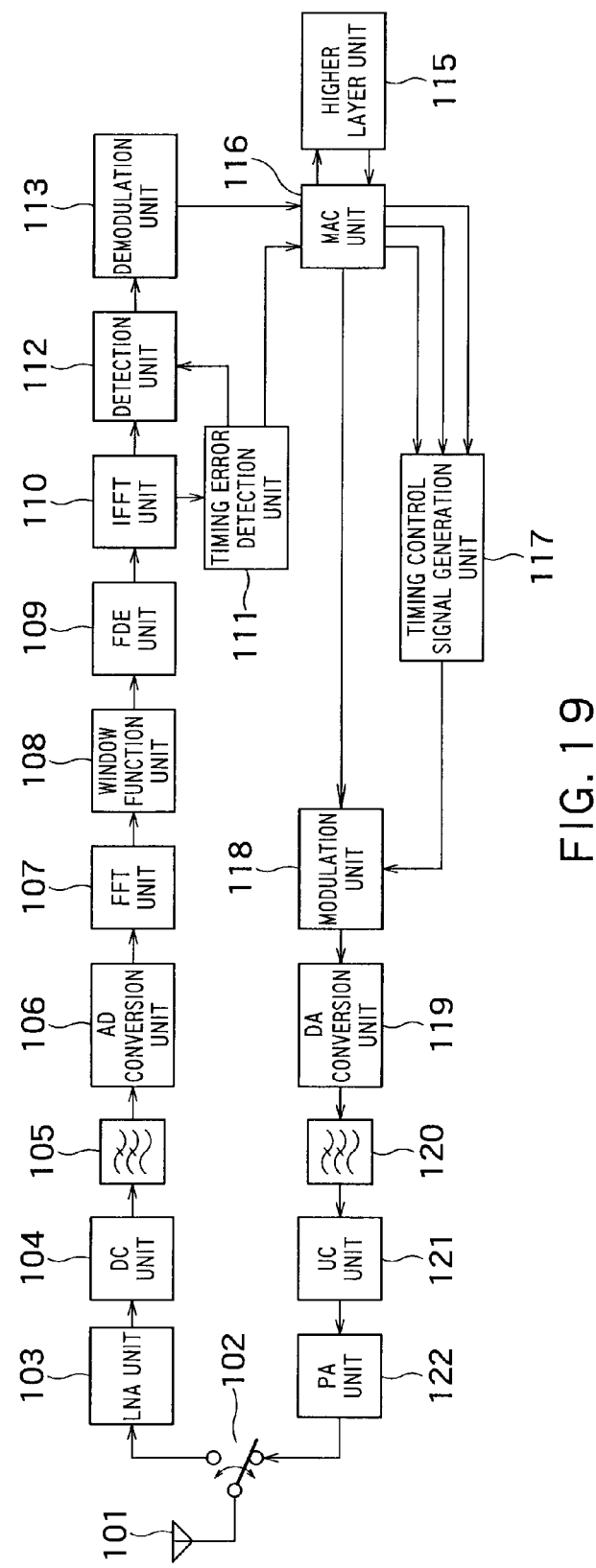
FIG. 19 is a block diagram showing the configuration of a base station according to an eighth embodiment.

FIG. 19 is a block diagram showing the configuration of a base station according to the eighth embodiment.

An antenna unit 101 receives a signal transmitted from a terminal apparatus during reception and emits a signal inputted from a base station switch unit 102 into the space as radio wave during transmission. The antenna unit 101 corresponds, for example, to a reception unit.

The switch unit 102 changes the switch so as to output the signal received at the antenna unit 101 to an LNA unit 103 during reception and output the signal inputted from a PA unit 122 to the antenna unit 101 during transmission.

The LNA unit 103 performs low noise amplification processing on the signal inputted from the switch unit 102 and outputs a signal subjected to the low noise amplification processing to a DC unit 104.

The DC unit 104 down-converts the RF (Radio Frequency) signal inputted from the LNA unit 103, generates an analog baseband signal and outputs the analog baseband signal generated to an LPF unit 105.

The LPF unit 105 performs filtering processing using an LPF (Low Pass Filter) to remove harmonic components from the signal inputted from the DC unit 104 and outputs the signal from which the harmonic components have been removed to an AD conversion unit 106.

The AD conversion unit 106 converts the analog signal inputted from the LPF unit 105 to a digital signal and outputs the digital signal to an FFT unit 107.

The FFT unit 107 performs FFT (Fast Fourier Transform) processing on the digital signal inputted from the AD conversion unit 106 to transform the digital signal from a time domain to a frequency domain and outputs the frequency domain signal to a window function unit 108. The FFT unit 107 corresponds, for example, to a Fourier transform unit.

The window function unit 108 performs window function processing on the frequency domain signal inputted from the FFT unit 107, thereby extracts a signal of a desired frequency component and outputs the extracted desired frequency component signal to an FDE (Frequency-Domain Equalization) unit 109.

The FDE unit 109 performs frequency domain equalization processing on the desired frequency domain component signal inputted from the window function unit 108 and outputs the signal subjected to the frequency domain equalization to an IFFT (Inverse Fast Fourier Transform) unit 110.

The IFFT unit 110 performs IFFT processing on the desired frequency domain component signal inputted from the FDE unit 109, transforms the signal into a time domain signal and outputs the time domain signal to a detection unit 112 and a timing error detection unit 111.

The timing error detection unit 111 detects a timing error from the time domain signal inputted from the IFFT unit 110 with respect to a desired FFT timing and outputs timing error information indicating the detected timing error to the detection unit 112 and a MAC unit 116. The timing error detection method can calculate a correlation between a known signal included in the received signal and an ideal known signal prestored in the timing error detection unit 111 and detect the timing error using a timing at which a peak of the correlation output appears. However, this timing error detection method is merely an example and the present invention is not limited to this method.

The detection unit 112 detects the time domain signal inputted from the IFFT unit 110 based on the timing error information inputted from the timing error detection unit 111 and outputs the detected data to a demodulation unit 113.

The demodulation unit 113 performs demodulation processing such as soft decision processing and decoding processing on the detected data inputted from the detection unit 112 and outputs the demodulated data to the MAC unit 116.

The MAC unit 116 performs MAC layer processing, extracts higher layer data from the demodulated data and passes the extracted higher layer data to a higher layer unit 115. Furthermore, the MAC unit 116 passes the timing error information received from the timing error detection unit 111 to a timing control signal generation unit 117.

The higher layer unit 115 receives information from the MAC unit 116 during reception, performs processing on a layer higher than the MAC layer and outputs the information obtained through the higher layer processing to the MAC unit 116 during transmission.

The MAC unit 116 performs MAC layer processing on the information inputted from the higher layer unit 115 and outputs the information to be transmitted to a modulation unit 118. Furthermore, the MAC unit 116 outputs the modulated information inputted from the higher layer unit 115 to be reported to the terminal apparatus to the timing control signal generation unit 117. The modulated information includes symbol rate information indicating a symbol rate to be transmitted to the terminal apparatus, CP symbol number information indicating the number of CP symbols in the block to be transmitted to the terminal apparatus and extended CP symbol number information indicating the number of extended CP symbols in the block to be transmitted to the terminal apparatus.

Therefore, the higher layer unit 115 includes, for example, a symbol rate reporting unit.

The timing control signal generation unit 117 generates timing information based on the modulated information and the timing error information inputted from the MAC unit 116 and outputs the timing information to the modulation unit 118. The timing control signal generation unit 117 has functions of, for example, a transmission timing calculation unit, transmission timing correction unit and timing information reporting unit.

The modulation unit 118 creates a modulated signal based on the information inputted from the MAC unit 116 and the timing information inputted from the timing control signal generation unit 117 and outputs the modulated signal to a DA conversion unit 119.

The DA conversion unit 119 converts the digital modulated signal inputted from the modulation unit 118 to an analog signal and outputs the analog signal to an LPF unit 120.

The LPF unit 120 performs filtering processing using an LPF (Low Pass Filter) to remove harmonic components from the analog signal inputted from the DA conversion unit 119 and outputs the signal from which the harmonic components have been removed to a UC unit 121.

The UC unit 121 up-converts the analog baseband signal inputted from the LPF unit 120 to a desired RF and outputs the RF signal to the PA unit 122.

The PA unit 122 amplifies power of the RF signal inputted from the UC unit 121 and outputs the amplified signal to the switch unit 102.

Figure 20:
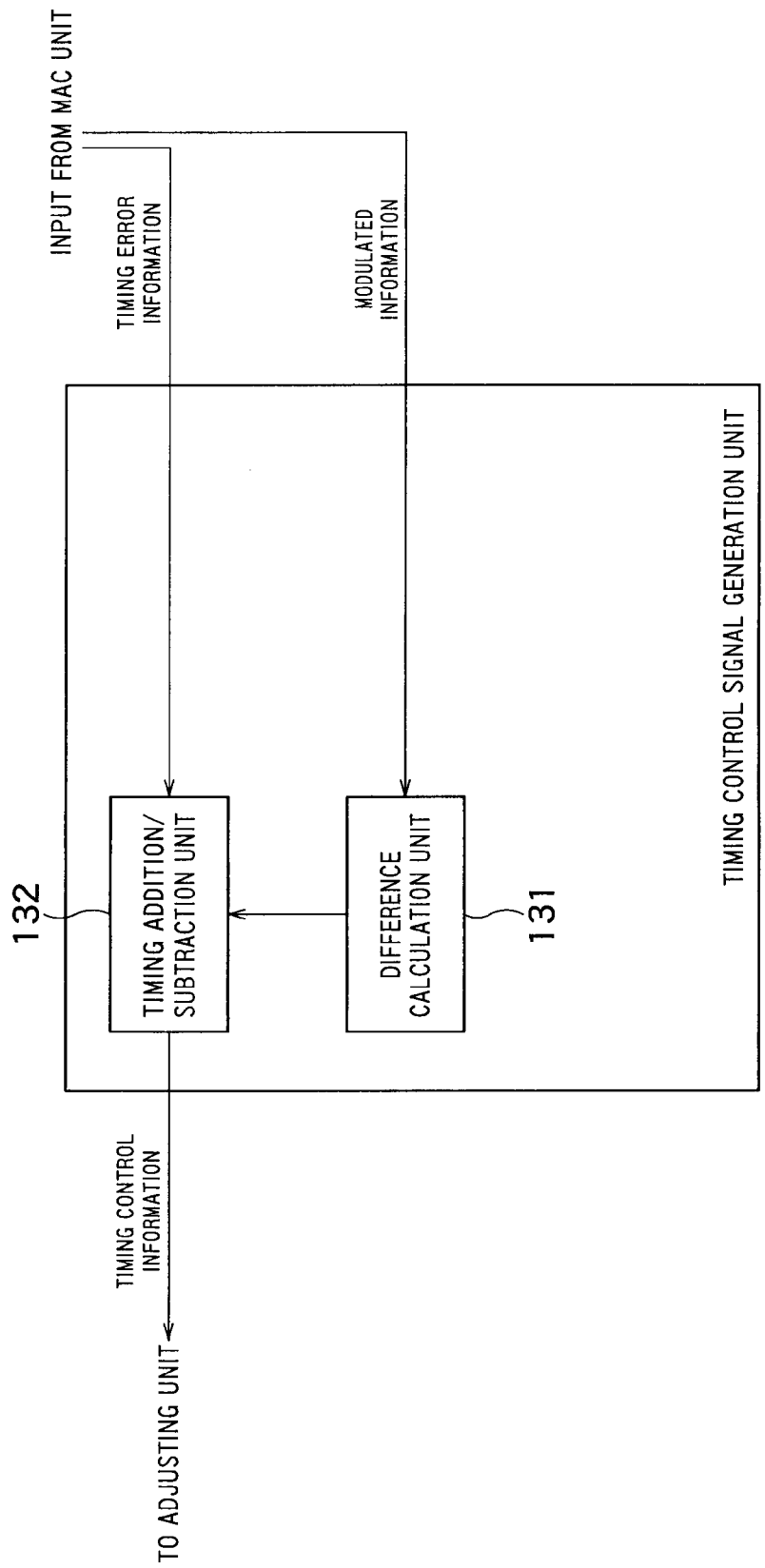
FIG. 20 is a block diagram showing the configuration of a timing control signal generation unit according to the eighth embodiment.

FIG. 20 is a block diagram showing the configuration of the timing control signal generation unit 117.

A difference calculation unit 131 receives the modulated information from the MAC unit 116 as input, calculates difference information of a transmission timing and outputs the calculated difference information of the transmission timing to a timing addition/subtraction unit 132. Assuming that a symbol rate transmitted to the terminal apparatus is r, the number of CP symbols of the block to be transmitted to the terminal apparatus is $S_{now}(r)$ and the number of extended CP symbols of the block to be transmitted to the terminal apparatus is $S_{Vnow}(r)$, the output $\Delta t_{comp0}$ of the difference calculation unit 131 is expressed by:

$$\Delta t_{comp0} = \frac{S_{ini}-1-S_{Vini}}{2} \cdot \frac{1}{r_{ini}} - \frac{S_{now}(r)-1-S_{Vnow}(r)}{2} \cdot \frac{1}{r} \quad \text{[Expression 15]}$$

Here, "$S_{ini}$" denotes the number of CP symbols of the transmission signal from the terminal apparatus used by the base station for timing error detection this time, "$S_{Vini}$" denotes the number of extended CP symbols of the transmission signal form the terminal apparatus used by the base station for timing error detection this time and "$r_{ini}$" denotes the symbol rate of the transmission signal from the terminal apparatus used for timing error detection. The difference calculation unit calculates $\Delta t_{comp0}$ based on $S_{ini}$, $S_{Vini}$, $r_{ini}$ and the modulated information inputted this time. $\Delta t_{comp0}$ obtained here is outputted to the timing addition/subtraction unit 132.

The timing addition/subtraction unit 132 adds up timing error $\Delta t_{cs}$ included in the timing error information inputted from the MAC unit 116 and $\Delta t_{comp0}$ inputted from the difference calculation unit 131 and outputs the addition result $\Delta t_{out} = \Delta t_{cs} + \Delta t_{comp0}$ to the modulation unit 118 as timing information.

In this way, when generating timing information for the terminal apparatus, it is possible to efficiently control transmission timings of the terminal apparatus by generating timing information by adding corrections in consideration of not only measured timing errors but also symbol rate updating information, updating information on the number of CP symbols, updating information on the number of extended CP symbols (e.g., correction according to the above described derivation expression).

In this embodiment, the difference calculation unit 131 calculates $\Delta t_{comp0}$ according to the derivation expression, but the present invention is not limited to the calculation based on the derivation expression, but as explained in the seventh embodiment, it is also possible to store the calculated value $\Delta t_{comp0}$ in a table (memory) based on the above described derivation expression or the like beforehand and find $\Delta t_{comp0}$ by referencing this table. It is also possible to apply values within range not considerably departing from the values in the derivation expression as values in the table by taking mounting errors or the like into consideration.

What is claimed is:

1. A terminal apparatus comprising:
a block generation unit configured to generate a block that includes a plurality of symbols being temporally consecutive and one or more repetition symbols as a cyclic prefix added to a head end of the symbols, the repetition symbols having a same waveform as a partial waveform including a rear end of the symbols, and a $S_{Vini}$ ($S_{Vini}$ is greater than or equal to 0) symbol preceding the partial waveform including the rear end of the symbols being an extended repetition symbol having same waveform as that of a $S_{Vini}$ symbol on a rear end of an immediately preceding block before the block, wherein the block is among a plurality of consecutive blocks generated by the block generation unit that have a same predetermined time length and a variable symbol rate;
a transmission timing calculation unit configured to calculate a transmission timing at which the block is to be transmitted to an external apparatus according to a symbol rate of the block and a number of extended repetition symbols included in the block, wherein said transmission timing for the block is delayed when the symbol rate of the block is lower than the immediately preceding block, and said transmission timing is advanced when the symbol rate of the block is higher than the immediately preceding block; and
a transmission unit configured to transmit the block to the external apparatus at the transmission timing calculated by the transmission timing calculation unit.

2. The apparatus according to claim 1, wherein
the transmission unit transmits a first block at a first symbol rate and a second block at a second symbol rate different from the first symbol rate,
when the symbol rate is changed from the first symbol rate to the second symbol rate, assuming that:
$r_{ini}$ is a value of the first symbol rate,
$S_{ini}$ is a number of repetition symbols in the first block,
$S_{Vini}$ is a number of extended repetition symbols in the first block,
r is a value of the second symbol rate,
$S_{now}$ is a number of repetition symbols in the second block, and
$S_{Vnow}$ is a number of extended repetition symbols in the second block,
the transmission timing calculation unit calculates an offset amount for a transmission timing of the first block according to the following formula $$\Delta t_{comp0} = 0.5(S_{ini}-S_{Vini}-1)/r_{ini} - 0.5(S_{now}-S_{Vnow}-1)/r$$

and calculates a transmission timing of the second block based on a calculated offset amount and the transmission timing of the first block.

3. The apparatus according to claim 1, wherein
the transmission unit transmits a first block at a first symbol rate and a second block at a second symbol rate different from the first symbol rate,
when the symbol rate is changed from the first symbol rate to the second symbol rate, assuming that:
$r_{ini}$ is a value of the first symbol rate,
$S_{ini}$ is a number of repetition symbols in the first block,
$S_{Vini}$ is a number of extended repetition symbols in the first block,
r is a value of the second symbol rate,
$S_{now}$ is a number of repetition symbols in the second block,
$S_{Vnow}$ is a number of extended repetition symbols in the second block, the transmission timing calculation unit
determines a transmission timing of the second block so that the transmission timing of the second block becomes earlier than the transmission timing of the first block as an absolute value of a difference between $(S_{now}-S_{Vnow}-1)/r$ and $(S_{ini}-S_{Vini}-1)/r_{ini}$ increases, when $(S_{now}-S_{Vnow}-1)/r$ is greater than $(S_{ini}-S_{Vini}-1)/r_{ini}$, and
determines a transmission timing of the second block so that the transmission timing of the second block becomes later than the transmission timing of the first block as an absolute value of a difference between $(S_{ini}-S_{Vini}-1)/r_{ini}$ and $(S_{now}-S_{Vnow}-1)/r$ increases, when $(S_{ini}-S_{Vini}-1)/r_{ini}$ is greater than $(S_{now}-S_{Vnow}-1)/r$.

4. The apparatus according to claim 2, further comprising a table configured to store the $S_{Vnow}$, the r, the $S_{now}$, the $S_{ini}$, the $r_{ini}$ and the $S_{Vini}$ in association with an offset amount of a transmission timing to be delayed or advanced,
   wherein the transmission timing calculation unit acquires an offset amount of a transmission timing to be delayed or advanced from the table based on the $S_{Vnow}$, the r, the $S_{now}$, the $S_{ini}$, the $r_{ini}$ and the $S_{Vini}$ and calculates a transmission timing of the second block according to an acquired offset amount and the transmission timing of the first block.

5. The apparatus according to claim 2, wherein
   the first symbol rate is a predetermined symbol rate and the $S_{ini}$, the $r_{ini}$ and the $S_{Vini}$ are predetermined values respectively,
   the terminal apparatus further comprises a table configured to store the $S_{Vnow}$, the r and the $S_{now}$ in association with an offset amount of a transmission timing to be delayed or advanced,
   wherein the transmission timing calculation unit acquires an offset amount of a transmission timing to be delayed or advanced from the table based on the $S_{Vnow}$, the r and the $S_{now}$, and calculates a transmission timing of the second block according to an acquired offset amount and the transmission timing of the first block.

6. A terminal apparatus comprising:
   a block generation unit configured to generate a block of a predetermined time length that includes a plurality of symbols being temporally consecutive and one or more repetition symbols as a cyclic prefix added to one end of the symbols, the repetition symbols having a same waveform as a partial waveform including the other end of the symbols, wherein the block is among a plurality of consecutive blocks generated by the block generation unit that have the same predetermined time length and a variable symbol rate;
   a transmission timing calculation unit configured to calculate, as a transmission timing at which the block is to be transmitted to an external apparatus, an earlier timing when a symbol rate of the block increases in comparison to an immediately preceding block and a later timing when a symbol rate of the block decreases in comparison to the immediately preceding block; and
   a transmission unit configured to transmit the block to the external apparatus at the transmission timing calculated by the transmission timing calculation unit.

7. The apparatus according to claim 6, further comprising a timing information acquisition unit configured to acquire timing information which defines a transmission timing of the block by transmitting a block including a first signal used for the external apparatus to determine the transmission timing of the block, from the external apparatus and,
   wherein the transmission timing calculation unit determines an earlier transmission timing than the transmission timing defined by the timing information when transmitting a block at a higher symbol rate than a symbol rate of the block with which the first signal is transmitted and determines a later transmission timing than the transmission timing defined by the timing information when transmitting a block at a lower symbol rate than a symbol rate of the block with which the first signal is transmitted.

8. The apparatus according to claim 7, wherein the first signal is a dedicated signal for the external apparatus to determine the transmission timing.

9. The apparatus according to claim 6, wherein when the symbol rate is changed to a second symbol rate, assuming that:
   $r_2$ is a value of the second symbol rate,
   $S_2$ is a number of repetition symbols included in a block of the second symbol rate,
   $r_x$ is a value of an Xth symbol rate which is either an immediately preceding symbol rate changed to the second symbol rate or a predetermined symbol rate, and
   $S_x$ is a number of repetition symbols included in a block of the Xth symbol rate,
   the transmission timing calculation unit
   determines a transmission timing at the second symbol rate so that the transmission timing at the second symbol rate becomes earlier than the transmission timing at the Xth symbol rate as an absolute value of a difference between $(S_2-1)/r_2$ and $(S_x-1)/r_x$ increases, when $(S_2-1)/r_2$ is greater than $(S_x-1)/r_x$, and
   determines a transmission timing at the second symbol rate so that the transmission timing at the second symbol rate becomes later than the transmission timing at the Xth symbol rate as an absolute value of a difference between $(S_x-1)/r_x$ and $(S_2-1)/r_2$ increases, when $(S_x-1)/r_x$ is greater than $(S_2-1)/r_2$.

10. The apparatus according to claim 9, wherein the transmission timing calculation unit
    determines a transmission timing resulting from advancing the transmission timing at the Xth symbol rate by a value based on $((S_2-1)/r_2-(S_x-1)/r_x)/2$ as a transmission timing at the second symbol rate, when $(S_2-1)/r_2$ is greater than $(S_x-1)/r_x$, and
    determines a transmission timing resulting from delaying the transmission timing at the Xth symbol rate by a value based on $((S_x-1)/r_x-(S_2-1)/r_2)/2$ as a transmission timing at the second symbol rate, when $(S_x-1)/r_x$ is greater than $(S_2-1)/r_2$.

11. The apparatus according to claim 9, further comprising a table configured to store the $S_2$, the $r_2$, the $S_x$ and the $r_x$ in association with an offset amount of a transmission timing to be advanced or delayed,
    wherein the transmission timing calculation unit acquires an offset amount of a transmission timing to be advanced or delayed from the table based on the $S_2$, the $r_2$, the $S_x$ and the $r_x$ and calculates a transmission timing of the block at the second symbol rate according to an acquired off time and the transmission timing at the Xth symbol rate.

12. The apparatus according to claim 9, wherein the Xth symbol rate is a determined symbol rate and the $S_x$ and the $r_x$ are predetermined values respectively,
    the terminal apparatus further comprises a table configured to store the $S_2$ and the $r_2$ in association with an offset amount of a transmission timing to be delayed or advanced, and
    the transmission timing calculation unit acquires an offset amount of the transmission timing to be delayed or advanced from the table based on the $S_2$ and the $r_2$ and calculates a transmission timing of the block at the second symbol rate according to an acquired offset amount and the transmission timing at the Xth symbol rate.

13. A base station, comprising:
    a reception unit configured to receive from a terminal apparatus a block of a predetermined time length that includes a plurality of symbols being temporally consecutive and one or more repetition symbols as a cyclic prefix added to one end of the symbols, the repetition symbols having same waveform as a partial waveform including the other end of the symbols, wherein the block is among a plurality of consecutive blocks received from the terminal apparatus that have the same predetermined time length and a variable symbol rate;

a Fourier transform unit configured to perform a Fourier transform on a signal of a received block in a FFT section having a length of the symbols;

a timing error detecting unit configured to detect a timing error of the Fourier transform performed on the signal of the received block with respect to a desired timing;

a transmission timing calculation unit configured to calculate a transmission timing for the terminal apparatus to transmit the block according to the timing error;

a symbol rate reporting unit configured to determine a symbol rate of a block to be transmitted from the terminal apparatus and report a determined symbol rate to the terminal apparatus;

a transmission timing correction unit to
correct a calculated transmission timing so that the calculated transmission timing becomes earlier when an absolute value of a difference between a determined symbol rate of an immediately preceding block and the symbol rate of the received block increases, when the determined symbol rate of the immediately preceding block is greater than that of the received block, and correct a calculated transmission timing so that the calculated transmission timing becomes later when an absolute value of a difference between the symbol rate of the received block and the determined symbol rate of the immediately preceding block increases, when the symbol rate of the received block is greater than the determined symbol rate; and a timing information reporting unit configured to report timing information indicating a corrected transmission timing to the terminal apparatus.

14. A communication method, implemented on a terminal apparatus, comprising:

generating, at the terminal apparatus, a block of a predetermined time length that includes a plurality of symbols being temporally consecutive and one or more repetition symbols as a cyclic prefix added to one end of the symbols, the repetition symbols having a same waveform as a partial waveform including the other end of the symbols, wherein the block is among a plurality of consecutive blocks generated by terminal apparatus that have the same predetermined time length and a variable symbol rate;

calculating, at the terminal apparatus, as a transmission timing at which the block is to be transmitted to an external apparatus, an earlier timing when a symbol rate of the block increases in comparison to an immediately preceding block and a later timing when a symbol rate of the block decreases in comparison to the immediately preceding block; and transmitting, at the terminal apparatus, the block at a calculated transmission timing.

\* \* \* \* \*